United States Patent
Bashir et al.

(10) Patent No.: US 12,401,654 B2
(45) Date of Patent: Aug. 26, 2025

(54) SYSTEM AND METHOD TO MAP HIERARCHICAL MULTI-TENANT ACCESS TO SERVICES

(71) Applicant: DISH Wireless L.L.C., Englewood, CO (US)

(72) Inventors: Kazi Bashir, Lewisville, TX (US); Rajesh Chilka, Littleton, CO (US); Mehdi Alasti, Arlington, VA (US); Siddhartha Chenumolu, Ashburn, VA (US)

(73) Assignee: DISH Wireless L.L.C., Englewood, CO (US)

( * ) Notice: Subject to any disclaimer, the term of this patent is extended or adjusted under 35 U.S.C. 154(b) by 156 days.

(21) Appl. No.: 18/479,644

(22) Filed: Oct. 2, 2023

(65) Prior Publication Data

US 2025/0112926 A1 Apr. 3, 2025

(51) Int. Cl.
*H04L 9/40* (2022.01)

(52) U.S. Cl.
CPC .......... *H04L 63/102* (2013.01); *H04L 63/105* (2013.01); *H04L 63/20* (2013.01)

(58) Field of Classification Search
CPC ...... H04L 63/102; H04L 63/105; H04L 63/20
See application file for complete search history.

(56) References Cited

U.S. PATENT DOCUMENTS

| | | |
|---|---|---|
| 8,452,726 B2 | 5/2013 | Kuruganti et al. |
| 10,089,070 B1 * | 10/2018 | Kanjariya ............... G10L 15/22 |
| 10,667,130 B2 * | 5/2020 | Bolte .................. H04W 12/068 |
| 10,721,237 B2 | 7/2020 | Vats et al. |
| 10,791,087 B2 | 9/2020 | Medam et al. |
| 10,963,349 B2 | 3/2021 | Dhamdhere et al. |
| 11,086,700 B2 | 8/2021 | Myneni et al. |
| 11,121,962 B2 | 9/2021 | Michael |
| 11,171,830 B2 | 11/2021 | Vaidya et al. |
| 11,347,806 B2 | 5/2022 | Tal et al. |
| 11,405,427 B2 * | 8/2022 | Desai ..................... H04L 47/20 |
| 11,483,329 B1 | 10/2022 | Singh et al. |

(Continued)

OTHER PUBLICATIONS

Kazi Bashir, System and method to implement name-spaces in hierarchical multi-tenant containerized service clusters, U.S. Appl. No. 18/479,604, filed Oct. 2, 2023, pp. 1-55.

*Primary Examiner* — El Hadji M Sall

(74) *Attorney, Agent, or Firm* — Baker Botts L.L.P.

(57) ABSTRACT

An apparatus comprises a memory and a processor communicatively coupled to one another. The memory may be configured to store one or more directories comprising access to multiple tenant profiles and one or more network access commands configured to provide access to one or more entitlements. Each tenant profile of the tenant profiles are associated with one or more services. The processor may be configured to receive a request to access at least one service. The request comprises an application function identifier (AFID) comprising a tenant ID that references a tenant profile of the tenant profiles, a department ID that references multiple entitlements associated with the tenant profile, and an API ID that references a service associated with the entitlements. Further, the processor may be configured to generate a report comprising multiple network access commands configured to enable access to the service in accordance with the entitlements.

20 Claims, 9 Drawing Sheets

(56) References Cited

U.S. PATENT DOCUMENTS

| | | |
|---|---|---|
| 11,570,146 B2 | 1/2023 | Liu et al. |
| 11,579,941 B2 | 2/2023 | Giannetti et al. |
| 11,700,196 B2 | 7/2023 | Michael et al. |
| 2003/0126465 A1* | 7/2003 | Tassone ............... H04L 63/102 726/4 |
| 2012/0102543 A1* | 4/2012 | Kohli .................... H04L 63/20 726/1 |
| 2020/0067789 A1 | 2/2020 | Khuti et al. |
| 2022/0100553 A1 | 3/2022 | Croteau et al. |
| 2022/0124013 A1 | 4/2022 | Chitalia et al. |
| 2022/0171648 A1 | 6/2022 | Rodriguez et al. |
| 2022/0182298 A1 | 6/2022 | Degioanni |

\* cited by examiner

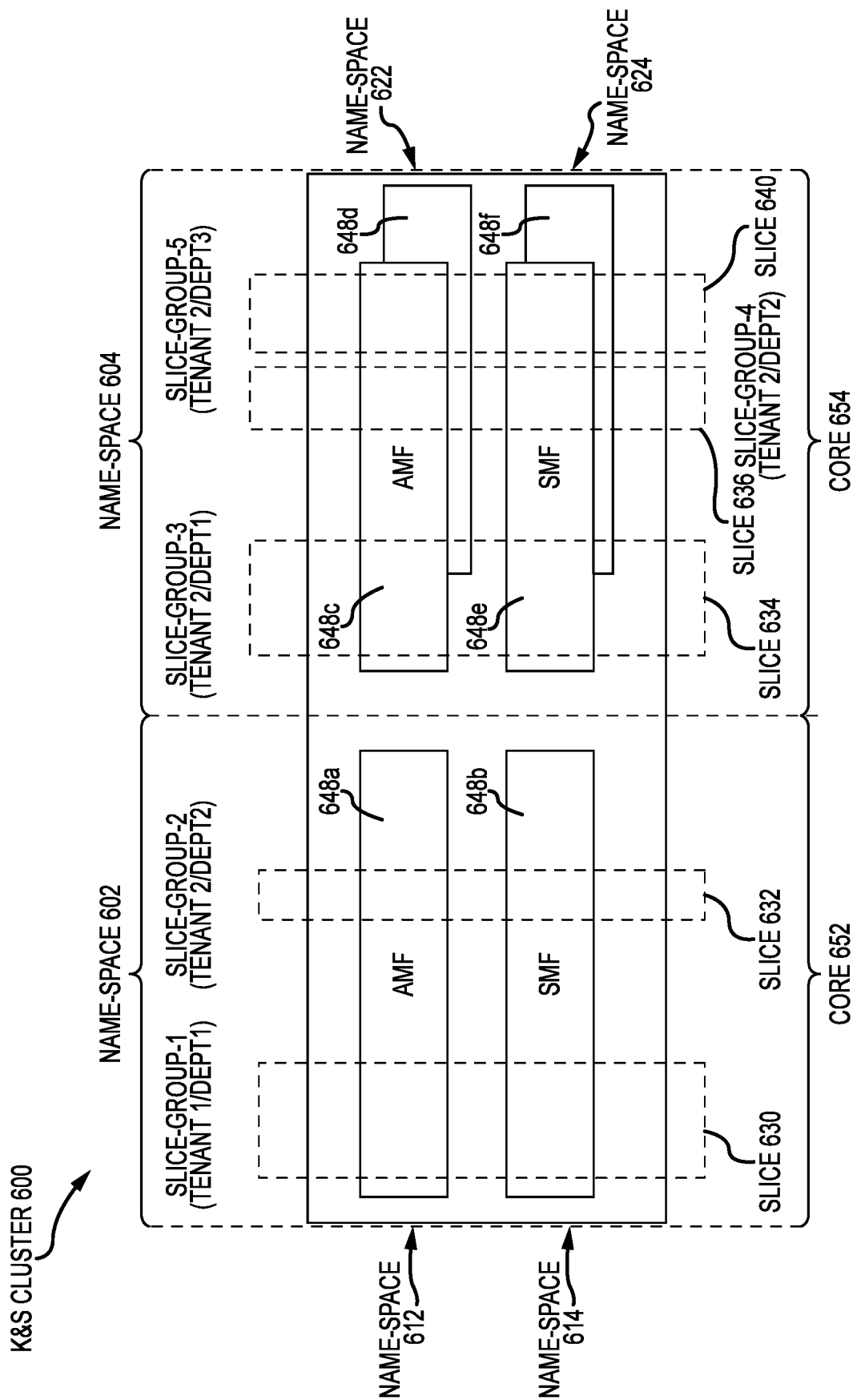

SYSTEM AND METHOD TO MAP HIERARCHICAL MULTI-TENANT ACCESS TO SERVICES

TECHNICAL FIELD

The present disclosure relates generally to access applications in a communication system, and more specifically to a system and method to map hierarchical multi-tenant access to services.

BACKGROUND

In some wireless communications systems, user devices associated with one or more tenants spend several device resources selecting application programming interfaces (API). These device resources may be power resources, memory resources, and processing resources that a given user device consumes while a user attempts to access a new service from the given user device. The device resources are wasted when the given user device lacks a structure to directly access services in a core network. For example, device resources may be wasted by attempting to enter a search query in a browser and scrolling through services to identify the new service to be accessed by the user device. In another example, device resources may be wasted in the process of trying to select multiple services available to the user device.

SUMMARY OF THE DISCLOSURE

Mapping Hierarchical Multi-Tenant Access to Services

In one or more embodiments, the system and method disclosed herein map hierarchical multi-tenant access to services. In particular, the system and method may be configured to map services to specific tenant profiles. Each tenant profile may comprise one or more departments. In accordance with rules and policies associated with a given tenant, the departments associated with the given tenant profile may have access to one or more of the services. Herein, the system and method comprise a hierarchical multi-tenant architecture in which each service may be directly referenced, accessed, or modified in accordance with three different tiers comprising a tenant tier, a department tier, and an application programmable interface (API) tier. In some embodiments, the hierarchical multi-tenant architecture indicates the tenant tier, the department tier, and the API tier in a single application function identifier (ID) (AFID). The AFID may comprise a tenant ID that references a tenant profile associated with a tenant, a department ID that references multiple entitlements associated with a department within the tenant profile, and an API ID that references one or more services associated with the entitlements.

In the hierarchical multi-tenant architecture, a tenant is assigned one tenant identifier (ID) or multiple tenant IDs. The tenant ID may be string of characters comprising symbols, letters, and/or numbers. The tenant ID may comprise human-readable words that indicate a name of a given tenant (e.g., "Tenant1," "Tenant2," and the like). A given tenant may comprise multiple departments. Each department may be assigned a department ID (e.g., "Department1," "Department2," and the like). Multiple services may be assigned to each department of a tenant. A group of tenants or a group of departments of a tenant may share one or multiple services. For instance, a first tenant ID for a first tenant may be "Tenant1" and a second tenant ID for a second tenant may be "Tenant2." For services that may be shared between Tenant1 and Tenant2, a shared tenant ID may be "Tenant1_Tenant2". In some embodiments, for services that may be shared across Department1 and Department2 of a Tenant1, a shared tenant ID may be "Tenant1.Department1_Department2." In this regard, access control lists, rules and policies, and system level agreements may be shared across tenants or departments. The tenants and/or corresponding departments may share APIs will be the same for both tenants and/or departments. In this regard, a set of APIs may be mapped to a specific tenant.

In one or more embodiments, the system and method described herein are integrated into a practical application of mapping hierarchical multi-tenant access to services. In this regard, the system and method are configured to map an access to services along with entitlements associated with those services in the AFID because the AFID provides: 1) a specific service; and 2) entitlements enabled by a tenant and one or more departments of the tenant for the specific service.

In addition, the system and method described herein are integrated into a technical advantage of increasing processing speeds in a computer system, because processors associated with the system and method prevent or eliminate waste of resources caused by searching and referencing individual entitlements associated with a request for a given service. Instead, the multi-tenant hierarchical mapping enables the use of the AFID to reference a specific service along with any entitlements available for the specific service in a single information element.

In one or more embodiments, the system and method may be performed by an apparatus, such as a server, communicatively coupled to multiple network components in a core network, one or more base stations in a radio access network, and one or more user equipment. Further, the system may be a wireless communication system, that comprises the apparatus. In addition, the system and method may be performed as part of a process performed by the apparatus communicatively coupled to the network components in the core network. As a non-limiting example, the apparatus may comprise a memory and a processor communicatively coupled to one another. The memory may be configured to store one or more directories comprising access to multiple tenant profiles and one or more network access commands configured to provide access to one or more entitlements. Each tenant profile of the tenant profiles may be associated with one or more services. The processor may be configured to receive a request to access at least one service. The request may comprise an application function identifier (AFID). The tenant ID may reference a tenant profile of the tenant profiles. The department ID may reference multiple entitlements associated with the tenant profile. The API ID may reference a service associated with the entitlements. Further, the processor may be configured to determine multiple network access commands configured to enable access to the service in accordance with the entitlements and generate a report comprising the network access commands.

Implementing Name-Spaces in Hierarchical Multi-Tenant Containerized Service Clusters In one or more embodiments, the system and method disclosed herein implement name-spaces in hierarchical multi-tenant containerized service clusters. The containerized service clusters may be Kubernetes configured as container orchestration platforms for scheduling and automating deployment, management, and scaling of containerized services (e.g., applications). In particular, the system and method may comprise a multi-core network configured to support services associated with multiple tenants. In this regard, the core network may comprise multiple cores may reside in a multi-cloud environment. The core network may comprise one tenant or multiple tenants. A given tenant may have one or multiple underlying departments. In some embodiments, each core may be mapped to a name-space within one or more Kubernetes (also referred to as K8s) clusters for a given core. As a result, each K8s cluster may comprise have multiple name-spaces. A K8s cluster may comprise multiple nodes in the core network that execute containerized services and applications. A name-space may comprise a containment space or environment created to hold reference, indicator, and/or identifier symbols (i.e. names). An identifier associated with a namespace may be associated only with that namespace.

In some embodiments, a name-space in a K8s cluster may comprise indicators to one or more network functions. A specific network function in the name-space may be accessed by identifying the name-space via a network ID. In cases where the specific network function in a name-space is divided into slice groups, a specific slice group of the specific network function may be accessed by identifying the name-space and the specific slice group in the Network ID. In this regard, a core network may be reached or references via a network ID, network function instance ID, or network slice ID (NSI-ID) that is mapped to a name-space in a specific K8s cluster. Further, the network functions (or sets of network functions of a specific core may be located in different K8s clusters with the same name-space. Herein, the name-space comprises multiple hierarchical accessed which enable different tiers of access. Some tiers may allow access to less network functions in a name-space while other tiers may allow access to more network functions in the same name-space. The network functions associated with a core in a K8s cluster name-space may be replaced or upgraded independently of any network functions located in other name-spaces in other cores. Further, these network functions may be scaled up/down or dimensioned in isolation from network functions in the other cores.

In one or more embodiments, the system and method described herein are integrated into a practical application of implementing name-spaces in hierarchical multi-tenant containerized service clusters. The system and method may be configured to provide access to specific network functions by referencing a name-space location in a core network. The name-space may be referenced and/or accessed using a network ID that is mapped to a hierarchical tier associated with a tenant attempting to access a given network function in the name-space.

In addition, the system and method described herein are integrated into a technical advantage of increasing processing speeds in a computer system, because processors associated with the system and method may directly reference or access network functions that are associated with a given tenant. Further, downtime of the core network may be prevented or eliminated by updating, modifying, or replacing network function in isolation from other network functions in other cores or other name-spaces.

In one or more embodiments, the system and method may be performed by an apparatus, such as a server, communicatively coupled to multiple network components in a core network, one or more base stations in a radio access network, and one or more user equipment. Further, the system may be a wireless communication system, that comprises the apparatus. In addition, the system and method may be performed as part of a process performed by the apparatus communicatively coupled to the network components in the core network. As a non-limiting example, the apparatus may comprise a memory and a processor communicatively coupled to one another. The memory may be configured to store one or more directories comprising access to multiple tenant profiles and one or more network access commands configured to provide access to one or more entitlements. Each tenant profile of the tenant profiles may be associated with one or more network functions. The processor may be configured to receive a request to access at least one network function of the one or more network functions, and extrapolate a tenant profile and a name-space ID from the network ID, or NF instance ID or NSI-ID. The name-space ID may indicate a name-space located in a Kubernetes cluster. Further, the processor may be configured to determine multiple network access commands based at least in part upon the tenant profile and the name-space ID, and generate a report comprising the network access commands. The network access commands may be configured to enable access to the name-space in the Kubernetes cluster.

Certain embodiments of this disclosure may comprise some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 6 illustrates an example of a Kubernetes cluster controlled by the communication system of FIG. 1, in accordance with one or more embodiments;

DETAILED DESCRIPTION

In one or more embodiments, the system and method map hierarchical multi-tenant access to services. In this regard, the system and method map application programming interfaces (API) to one or more departments associated with a given tenant profile in a communication system. One or more services in the communication system may be accessed via an application function identifier (ID) that indicates one or more APIs corresponding to a department within a given tenant. In one or more embodiments, the system and method implement name-spaces in hierarchical multi-tenant containerized service clusters. In this regard, the system and method separate network functions into name-spaces within Kubernetes clusters. A given network function may be accessed by referencing a corresponding name-space.

Figure 1:
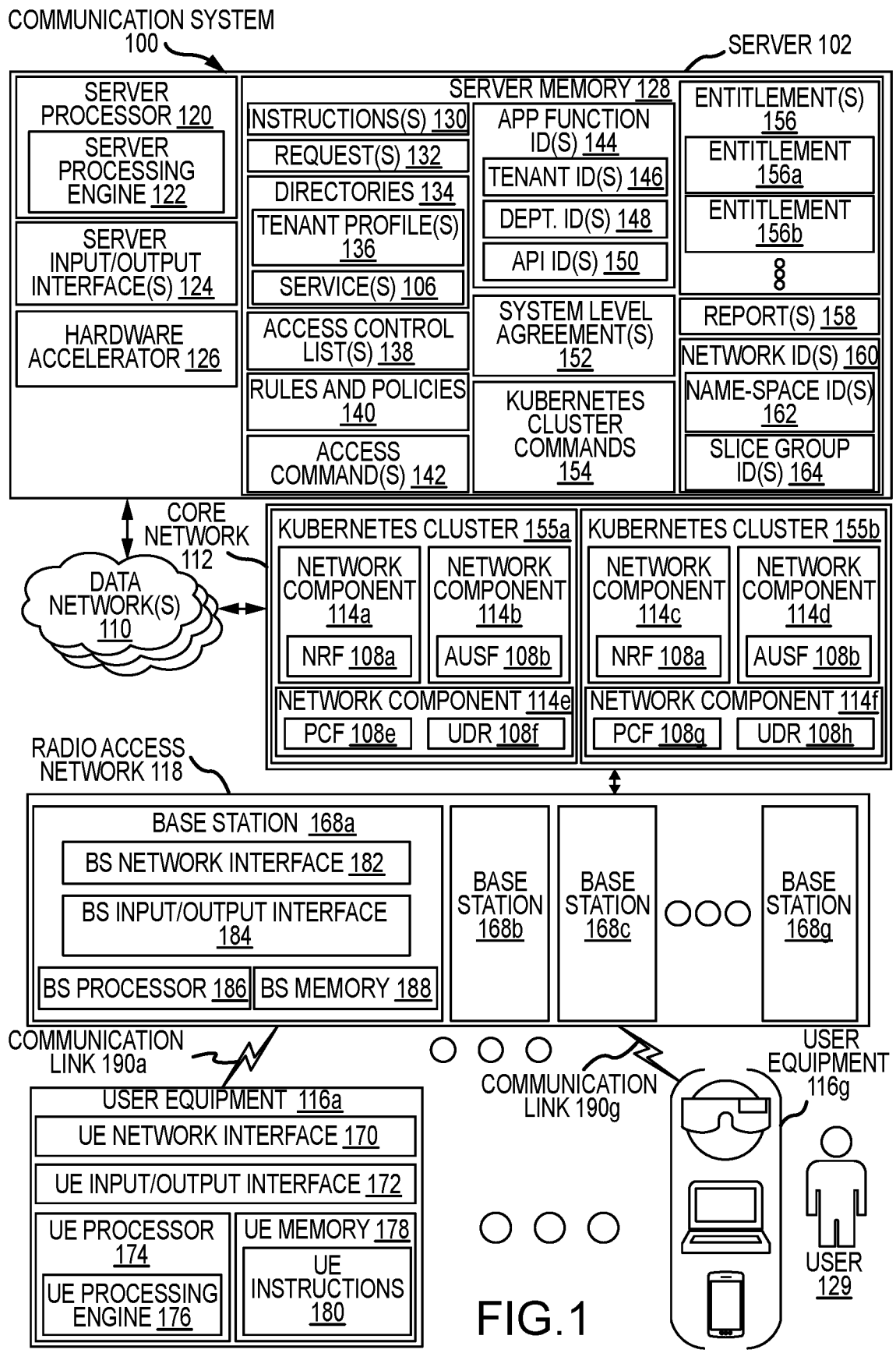
FIG. 1 illustrates an example communication system, in accordance with one or more embodiments.
Figure 2A:
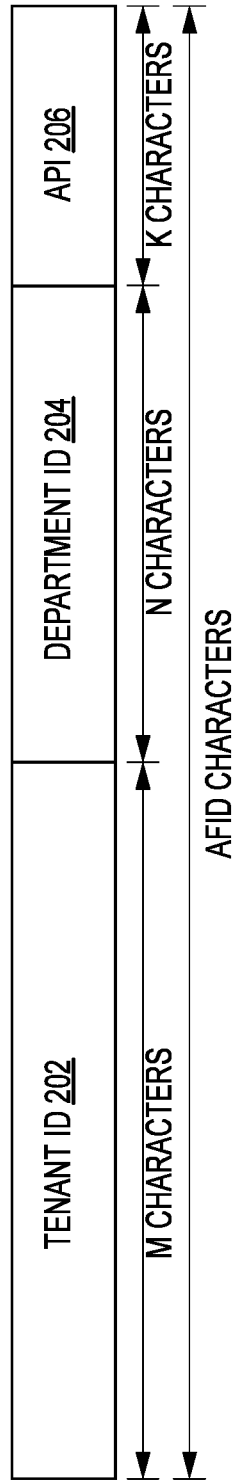
FIGS. 2A and 2B illustrate examples of application function identifier (AFID) structures implemented by the communication system of FIG. 1, in accordance with one or more embodiments.
Figure 2B:
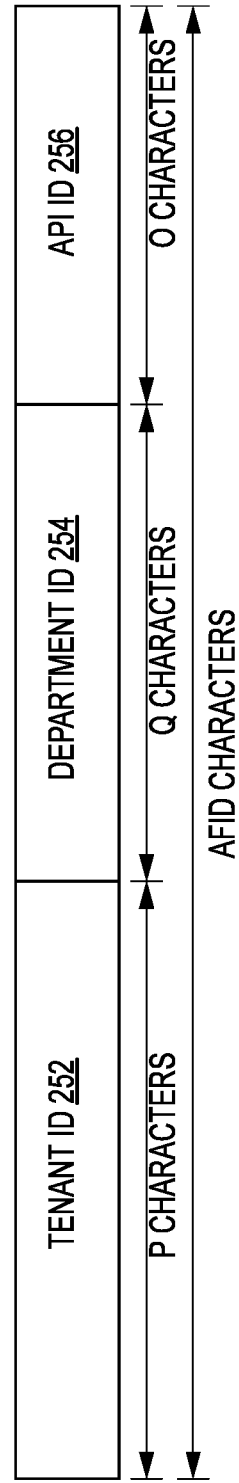
Figure 3:
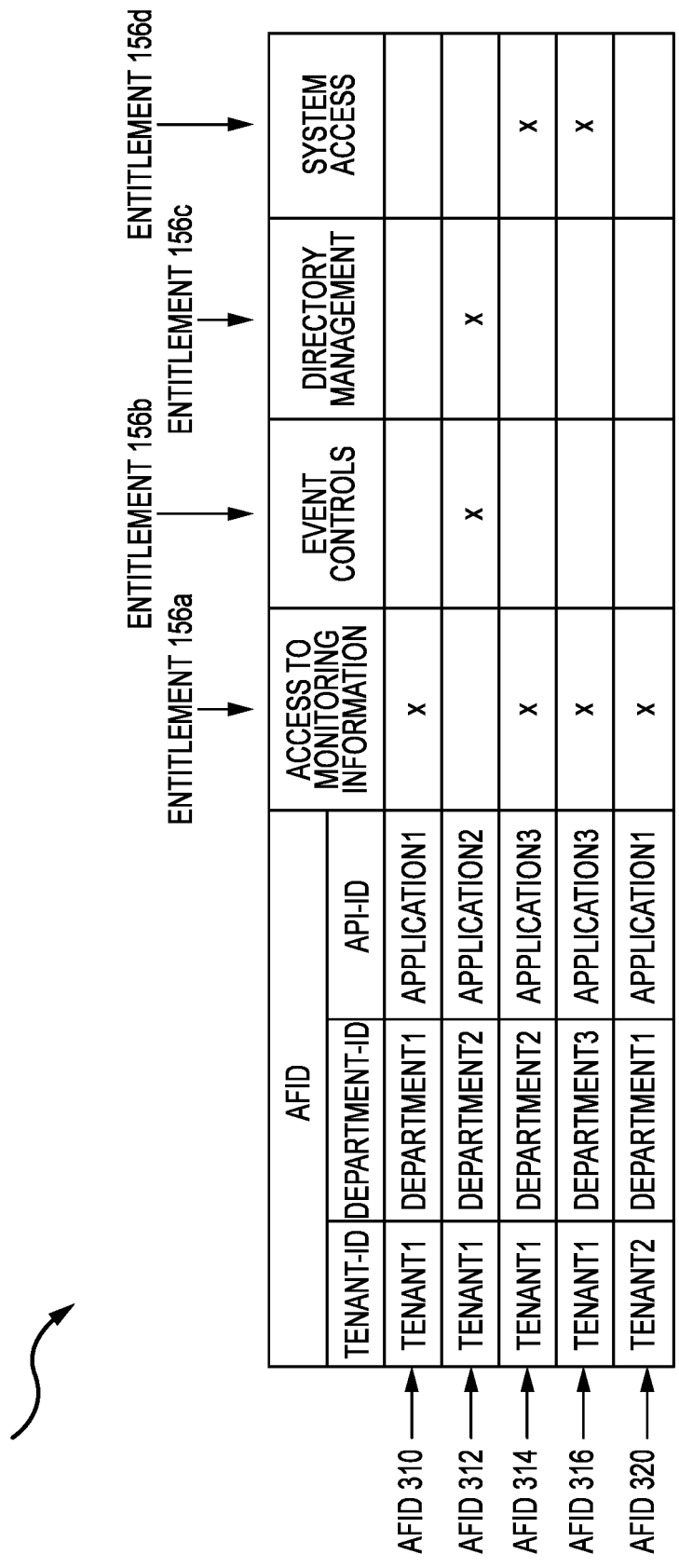
FIG. 3 illustrates example AFID mapping operations performed by the communication system of FIG. 1, in accordance with one or more embodiments.
Figure 4:
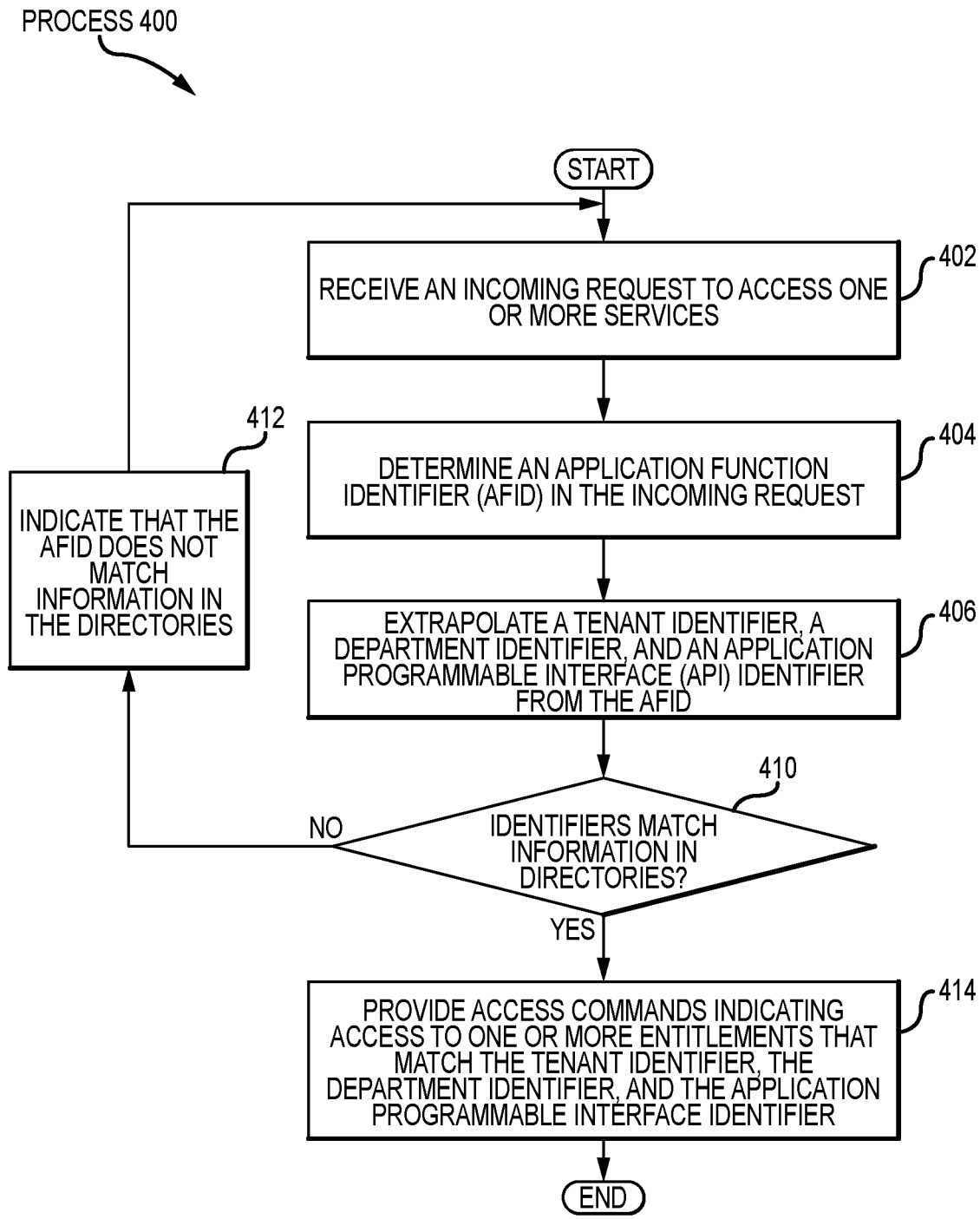
FIG. 4 illustrates an example flowchart of a method to map hierarchical multi-tenant access to services, in accordance with one or more embodiments.
Figure 5A:
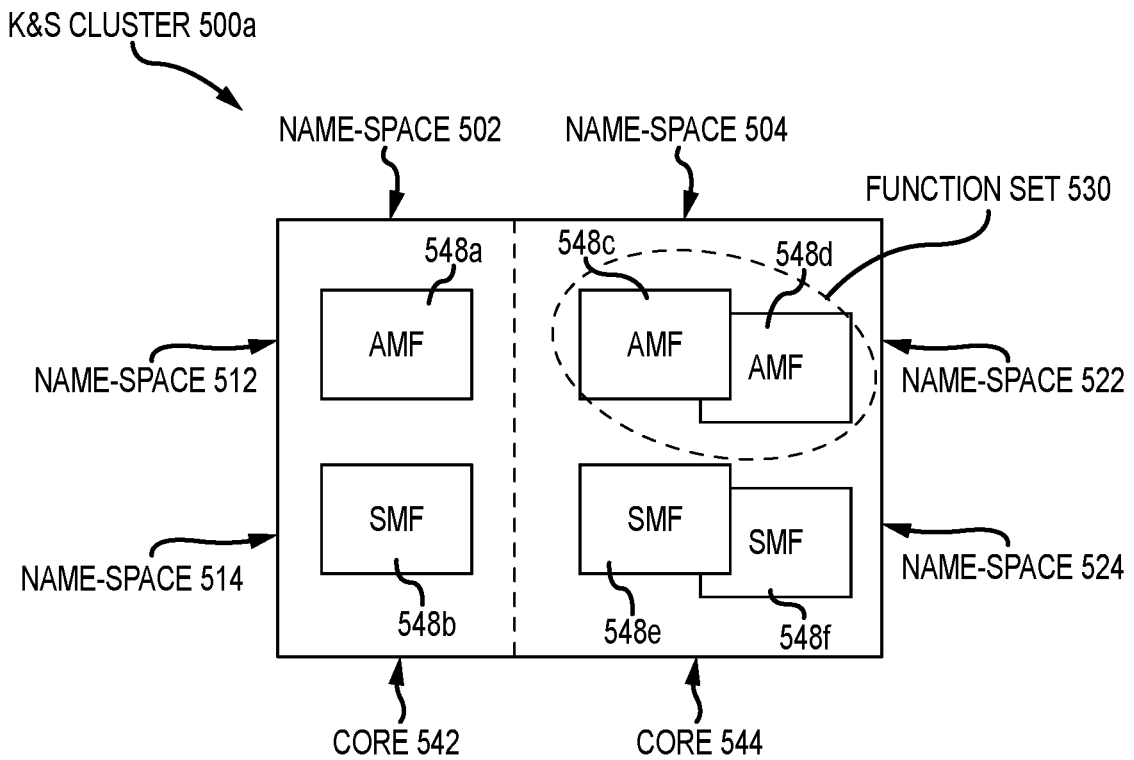
FIGS. 5A and 5B illustrate examples of Kubernetes clusters controlled by the communication system of FIG. 1, in accordance with one or more embodiments.
Figure 5B:
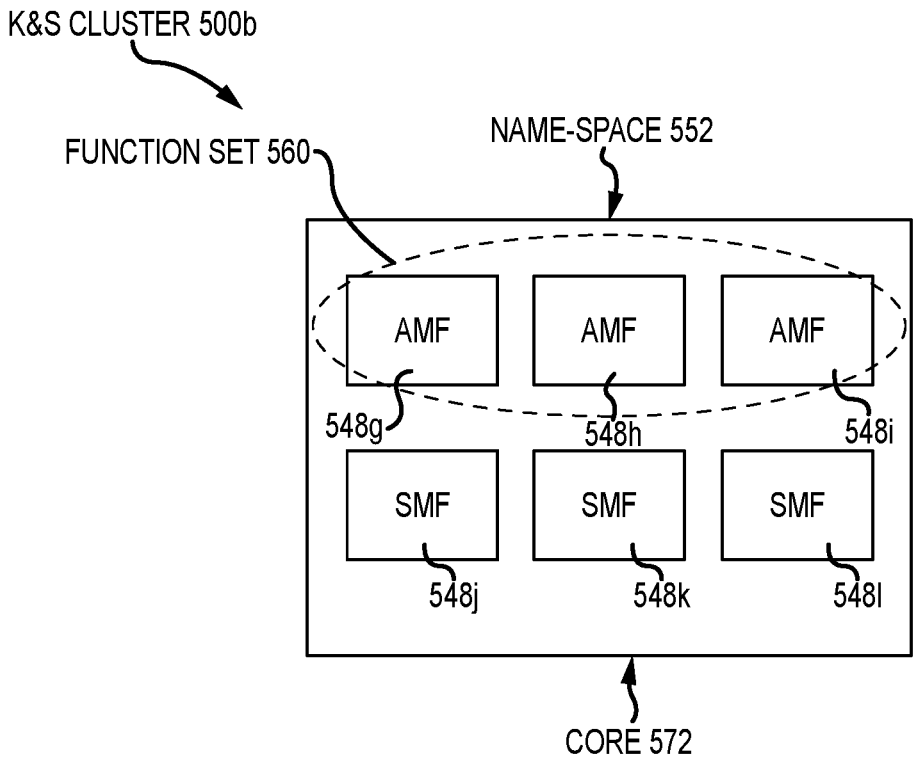
Figure 7A:
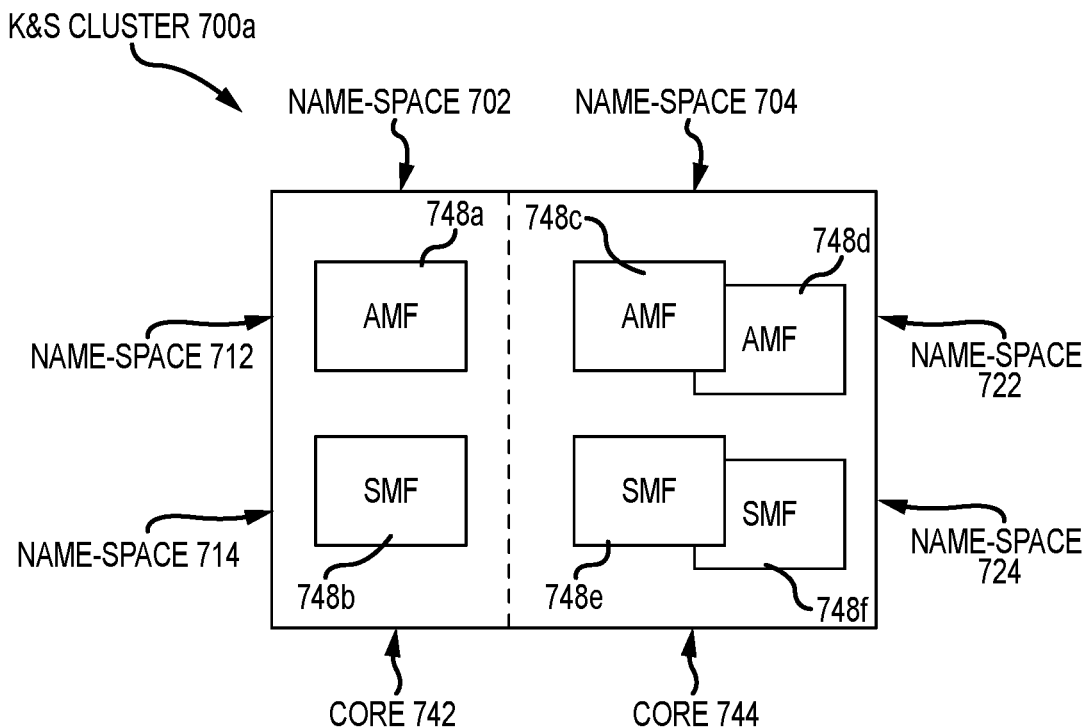
FIGS. 7A and 7B illustrate examples of Kubernetes clusters controlled by the communication system of FIG. 1, in accordance with one or more embodiments.
Figure 7B:
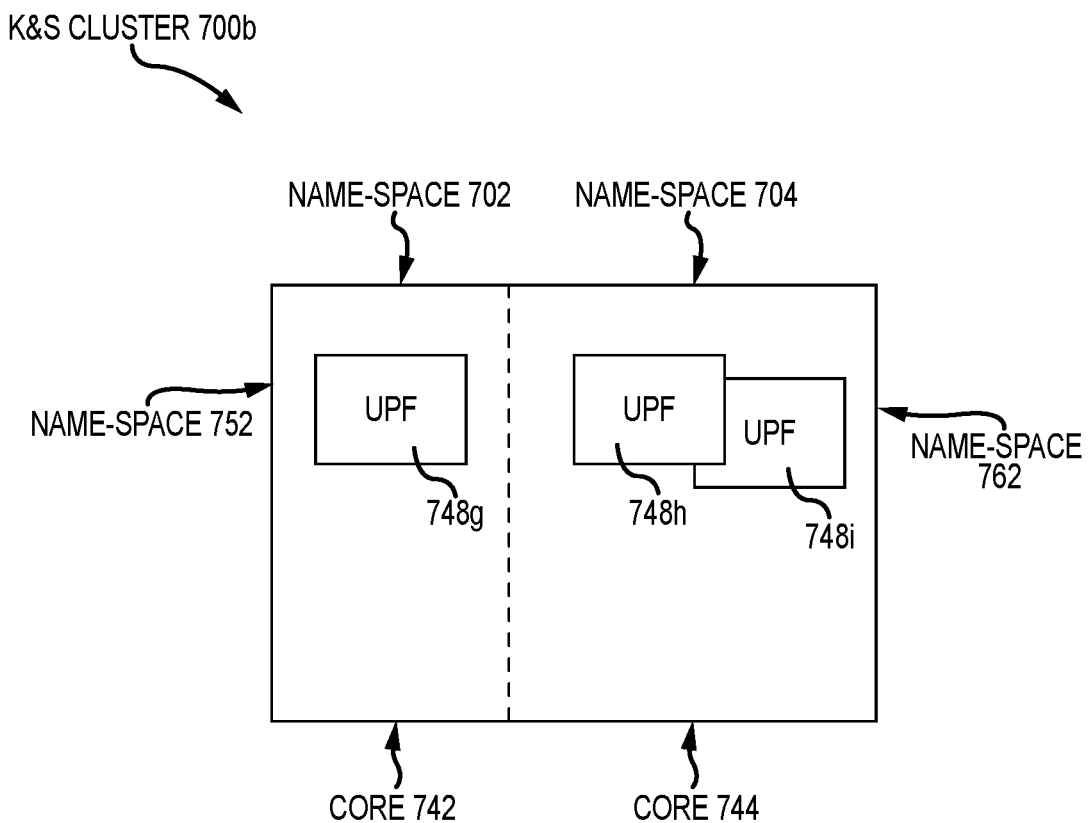
Figure 8A:
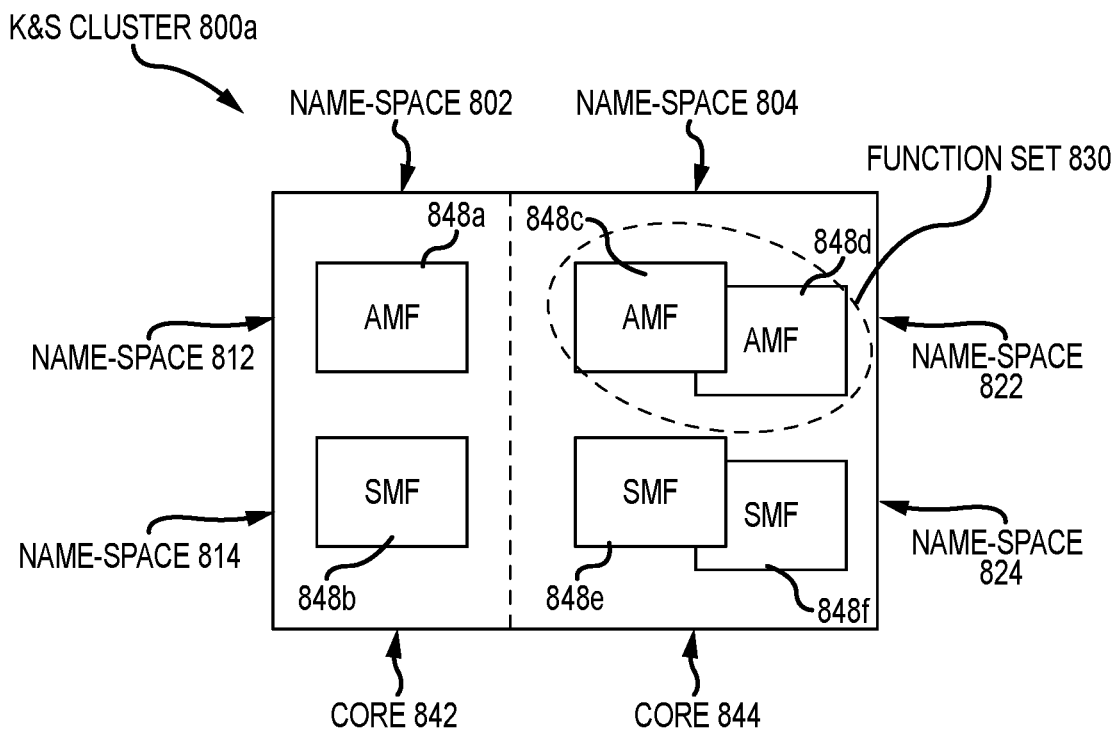
FIGS. 8A and 8B illustrate examples of Kubernetes clusters controlled by the communication system of FIG. 1, in accordance with one or more embodiments.
Figure 8B:
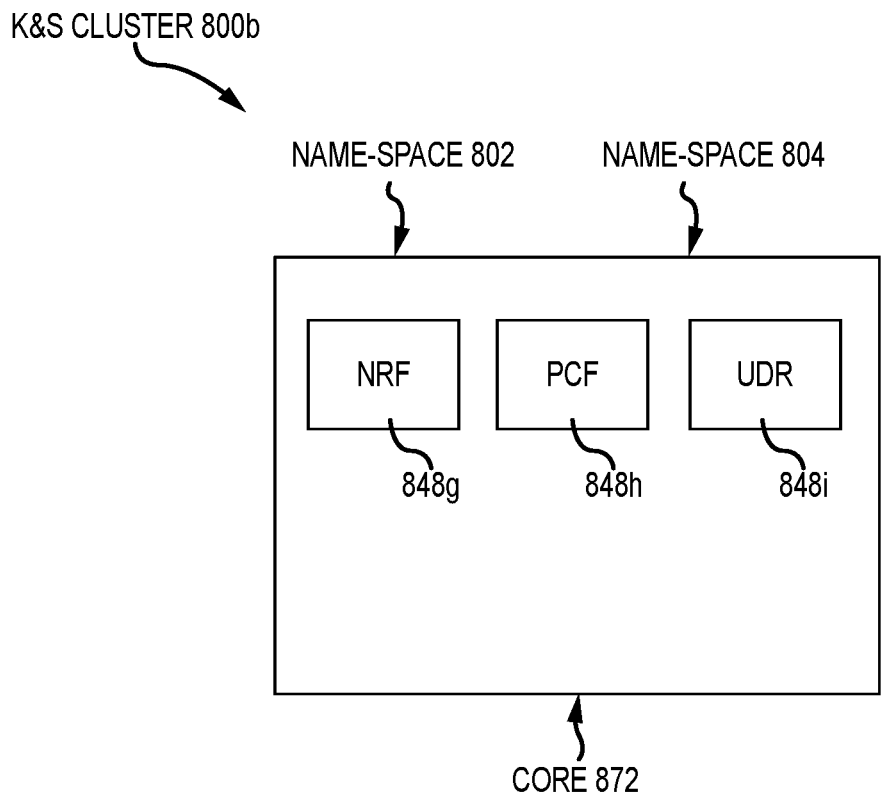
Figure 9:
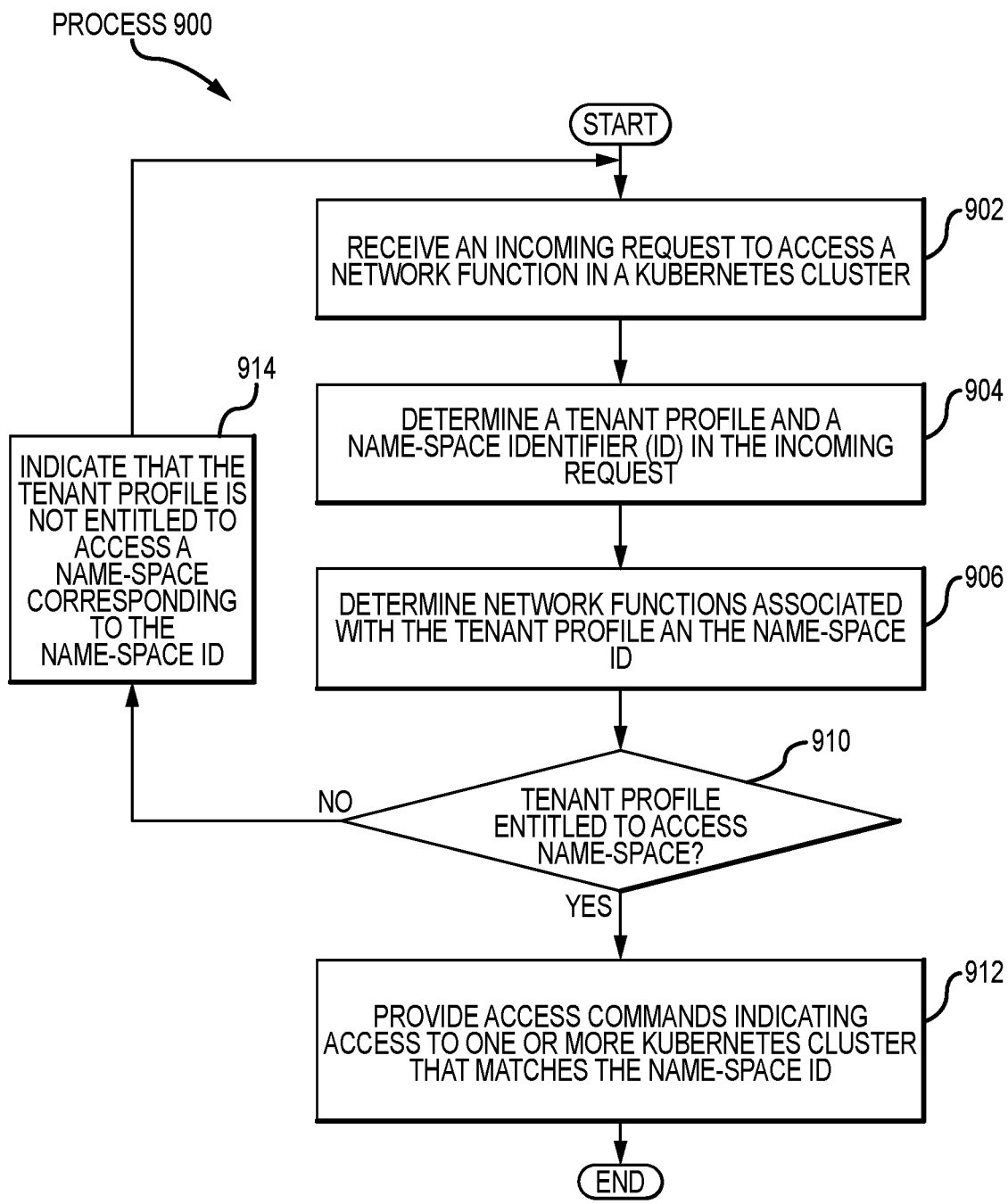
FIG. 9 illustrates an example flowchart of a method to implement name-spaces in hierarchical multi-tenant containerized service clusters, in accordance with one or more embodiments.

In one or more embodiments, FIG. 1 illustrates a communication system 100 in which a server 102 generates one or more access commands 104 to access specific services 106 and/or network functions (NFs) 108a-108h (collectively, NFs 108). FIGS. 2A and 2B illustrate an application function identifier structure 200a and an application function identifier structure 200b, respectively. The application function identifier structure 200a and the application function identifier structure 200b are implemented by the communication system 100 of FIG. 1. FIG. 3 illustrates application function identifier (ID) (AFID) mapping operations 300 to access the services 106 performed by the communication system 100 of FIG. 1. FIG. 4 illustrates a process 400 performed by the communication system 100 of FIG. 1. FIGS. 5A and 5B illustrate a K8s cluster 500a and a K8s cluster 500b, respectively. The K8s cluster 500a comprises multiple name-spaces 502-524 and the K8s cluster 500b comprises one name-space 552 are implemented by the communication system 100 of FIG. 1. FIG. 6 illustrate a K8s cluster 600 comprising multiple name-spaces 602-624 and multiple slices 630-640 implemented by the communication system 100 of FIG. 1. FIGS. 7A and 7B illustrate a K8s cluster 700b and a K8s cluster 700b, respectively. The K8s cluster 700a comprises the name-spaces 704-724 and the K8s cluster 700b comprises the name-spaces 702, 704, 752, and 762 implemented by the communication system 100 of FIG. 1. FIGS. 8A and 8B illustrate a K8s cluster 800b and a K8s cluster 800b, respectively. The K8s cluster 800a comprises the name-spaces 802-824 and the K8s cluster 800b comprises the name-space 802 are implemented by the communication system 100 of FIG. 1. FIG. 9 illustrates a process 900 performed by the communication system 100 of FIG. 1.

Communication System Overview

FIG. 1 illustrates a diagram of a communication system 100 (e.g., a wireless communication system) comprises a server 102 configured to generate network access command 104 to access one or more services 106 and/or one or more network functions (NFs) 108a-108h (collectively, NFs 108), in accordance with one or more embodiments. The services 106 and the NFs 108 may be located in one or more data networks 110 and/or one or more core networks 112. Herein, the services 106 comprise applications, access to resources, and/or allowance to perform modifications. In FIG. 1, the server 102 is communicatively coupled to multiple devices in the communication system 100. While FIG. 1 shows the server 102 connected directly to the one or more data networks 110, the server 102 may be located inside the core network 112 as part of one or more network components 114a-114f (collectively, network components 114) in the core network 112.

In one or more embodiments, the communication system 100 comprises the user equipment 116a-116g (collectively, user equipment 116), a radio access network (RAN) 118, the core network 112, the one or more data networks 110, and the server 102. In some embodiments, the communication system 100 may comprise a Fifth Generation (5G) mobile network or wireless communication system, utilizing high frequency bands (e.g., 24 Gigahertz (GHz), 39 GHz, and the like) or lower frequency bands such as (e.g., frequency range FR1 Sub 6 GHz-less than 7.125 GHz). In this regard, the communication system 100 may comprise a large number of antennas. In some embodiments, the communication system may perform one or more communication operations associated with 5G New Radio (NR) protocols described in reference to the Third Generation Partnership Project (3GPP). As part of the 5G NR protocols, the communication system 100 may perform one or more millimeter (mm) wave technology operations to improve bandwidth or latency in wireless communications.

In some embodiments, the communication system 100 may be configured to partially or completely enable communications via one or more various radio access technologies (RATs), wireless communication technologies, or telecommunication standards, such as Global System for Mobiles (GSM) (e.g., Second Generation (2G) mobile networks), Universal Mobile Telecommunications System (UMTS) (e.g., Third Generation (3G) mobile networks), Long Term Evolution (LTE) of mobile networks, LTE-Advanced (LTE-A) mobile networks, 5G NR mobile networks, or Sixth Generation (6G) mobile networks.

Service-Based Architecture

The communication system 100 may comprise a service-based architecture (SBA). The SBA may be an organization scheme in the core network 112 that comprises authentication, security, session management, and aggregation of traffic from end devices (e.g., the user equipment 116). In the SBA, the core network 112 may be representative of the 5G Core network and comprises multiple network components 114. In the SBA, the network components 114 are hardware (e.g., electronic circuitry with communication ports, a processor, and a memory) configured to perform one or more specific NFs 108. Herein, network components 114a-114f configured to perform one or more NFs 108 maybe referenced using an NF-associated name. For example, a network component 114a configured to perform a network repository function (NRF) 108a may be referred to as an NRF (or a NRF network component). In another example, one of the network components 114a-114f may comprise a version of the server 102 with a server processor 120 configured to perform one or more specific NFs 108.

In some embodiments, individual network components 114 provide services or resources to other network components 114 performing different NFs 108. In other embodiments, each NF is a service provider that allocates one or more resources in communications inside or outside the network components 114 to provide one or more services. The services may be specific for each of the network components 114 and their respective NFs 108 instead of each of the network components 114 providing and consuming processing resources and memory resources to perform multiple NFs 108 in the core network 112. In 5G NR mobile networks, the SBA is defined by 3GPP to comprise one or more network components 114 configured to perform specific NFs 108 to provide control plane operations and user plane operations. In the 5G NR, the control plane comprises any part of the communication system 100 that controls operations and routing associated with data packets and forwarding operations. Further, in the 5G NR, the user plane comprises any part of the communication system 100 that carries user traffic operations.

In one or more embodiments, the SBA may be configured to provide slices in accordance with specific application scenarios. A slice may be portions of a collection of NFs 108 that are combined into providing specific application resources. The application resources may be provided to one or more user equipment 116 simultaneously via web-based Application Programming Interfaces (APIs). The APIs may enable flexible and agile deployment of innovative services. An API may be a set of instructions that, when executed by a processor, perform modular or cloud-native functions and procedures allowing creation of applications (e.g., the services 106) that access features or data of an operating system, application, or other service in the communication system 100.

Communication System Components

Server

The server 102 is generally any device that is configured to process data, communicate with the data networks 110, one or more network components 114 in the core network 112, the RAN 118, and the user equipment 116. The server 102 may be configured to monitor, track data, control routing of signal, and control operations of certain electronic components in the communication system 100, associated databases, associated systems, and the like, via one or more interfaces. The server 102 is generally configured to oversee operations of the server processing engine 122. The operations of the server processing engine 122 are described further below. In some embodiments, the server 102 comprises the server processor 120, one or more server Input (I)/Output (O) interfaces 124, a hardware accelerator 126, and a server memory 128 communicatively coupled to one another. The server 102 may be configured as shown, or in any other configuration. As described above, the server 102 may be located in one of the network components 114 located in the core network 112 and may be configured to perform one or more NFs 108 associated with communication operations of the core network 112.

In one or more embodiments, the server processor 120, the server I/O interfaces 124, the hardware accelerator 126, and the server memory 128 may be located at a same location or distributed over multiple remote locations separate from one another.

The server processor 120 may comprise one or more processors operably coupled to and in signal communication with the server I/O interfaces 124, the hardware accelerator 126, and the server memory 128. The server processor 120 is any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). The server processor 120 may be a programmable logic device, a microcontroller, a microprocessor, or any suitable combination of the preceding. The one or more processors in the server processor 120 are configured to process data and may be implemented in hardware or software executed by hardware. For example, the server processor 120 may be an 8-bit, a 16-bit, a 32-bit, a 64-bit, or any other suitable architecture. The server processor 120 may comprise an arithmetic logic unit (ALU) to perform arithmetic and logic operations, processor registers that supply operands to the ALU, and store the results of ALU operations, and a control unit that fetches software instructions such as server instructions 130 from the server memory 128 and executes the server instructions 130 by directing the coordinated operations of the ALU, registers and other components via the server processing engine 122. The server processor 120 may be configured to execute various instructions. For example, the server processor 120 may be configured to execute the server instructions 130 to perform functions or perform operations disclosed herein, such as some or all of those described with respect to FIGS. 1-9. In some embodiments, the functions described herein are implemented using logic units, FPGAs, ASICs, DSPs, or any other suitable hardware or electronic circuitry.

In the example of FIG. 1, the server I/O interfaces 124 may comprise one or more displays configured to display a two-dimensional (2D) or three-dimensional (3D) representation of a service. Examples of the representations may comprise, but are not limited to, a graphical or simulated representation of an application, diagram, tables, or any other suitable type of data information or representation. In some embodiments, the one or more displays may be configured to present visual information to one or more users 129. The one or more displays may be configured to present visual information to the one or more users 129 updated in real-time. The one or more displays may be a wearable optical display (e.g., glasses or a head-mounted display (HMD)) configured to reflect projected images and enable user to see through the one or more displays. For example, the one or more displays may comprise display units, one or more lenses, one or more semi-transparent mirrors embedded in an eye glass structure, a visor structure, or a helmet structure. Examples of display units comprise, but are not limited to, a cathode ray tube (CRT) display, a liquid crystal display (LCD), a liquid crystal on silicon (LCOS) display, a light emitting diode (LED) display, an organic LED (OLED) display, an active-matrix OLED (AMOLED) display, a projector display, or any other suitable type of display. In another embodiment, the one or more displays are a graphical display on the server 102. For example, the graphical display may be a tablet display or a smartphone display configured to display the data representations.

In one or more embodiments, the server I/O interfaces 124 may be hardware configured to perform one or more communication operations. The server I/O interfaces 124 may comprise one or more antennas as part of a transceiver, a receiver, or a transmitter for communicating using one or more wireless communication protocols or technologies. In some embodiments, the server I/O interfaces 124 may be configured to communicate using, for example, NR or LTE using at least some shared radio components. In other embodiments, the server I/O interfaces 124 may be configured to communicate using single or shared radio frequency (RF) bands. The RF bands may be coupled to a single antenna, or may be coupled to multiple antennas (e.g., for a multiple-input multiple output (MIMO) configuration) to perform wireless communications.

The server I/O interfaces 124 may comprise one or more server network interfaces that may be any suitable hardware or software (e.g., executed by hardware) to facilitate any suitable type of communication in wireless or wired connections. These connections may comprise, but not be limited to, all or a portion of network connections coupled to additional network components 114 in the core network 112, the RAN 118, the user equipment 116, the Internet, an Intranet, a private network, a public network, a peer-to-peer network, the public switched telephone network, a cellular network, a local area network (LAN), a metropolitan area network (MAN), a wide area network (WAN), and a satellite network. The server network interface 124 may be configured to support any suitable type of communication protocol.

The server I/O interfaces 124 may comprise one or more administrator interfaces that may be user interfaces configured to provide access and control to of the server 102 to one or more users 129 via the user equipment 116 or electronic devices. The one or more users 129 may access the server memory 128 upon confirming one or more access credentials to demonstrate that access or control to the server 102 may be modified. In some embodiments, the one or more administrator interfaces may be configured to provide hardware and software resources to the one or more users 129. Examples of user devices comprise, but are not limited to, a laptop, a computer, a smartphone, a tablet, a smart device, an Internet-of-Things (IoT) device, a simulated reality device, an augmented reality device, or any other suitable type of device. The administrator interfaces may enable access to one or more graphical user interfaces (GUIs) via an image generator display (e.g., the one or more displays), a touchscreen, a touchpad, multiple keys, multiple buttons, a mouse, or any other suitable type of hardware that allow users 129 to view data or to provide inputs into the server 102. The server 102 may be configured to allow users 129 to send requests to one or more network components 114 or network.

In some embodiments, the hardware accelerator 126 may be any combination of a baseband processor, analog RF signal processing circuitry (e.g., including filters, mixers, oscillators, amplifiers, and the like), or digital processing circuitry (e.g., for digital modulation as well as other digital processing). For example, the hardware accelerator 126 may be configured to allocate power, frequency, and sensing resources during wireless communication operations.

The server memory 128 may be volatile or non-volatile and may comprise a read-only memory (ROM), random-access memory (RAM), ternary content-addressable memory (TCAM), dynamic random-access memory (DRAM), and static random-access memory (SRAM). The server memory 128 may be implemented using one or more disks, tape drives, solid-state drives, and/or the like. The server memory 128 is operable to store the server instructions 130, one or more requests 132, one or more directories 134 comprising access to a plurality of tenant profiles 136 associated with the one or more services 106 and the one or more of the NFs 108, an access control list 138, one or more rules and policies 140, one or more access commands 142, one or more application function IDs (AFID) 144 comprising one or more tenant IDs 146, one or more department IDs 148, and one or more application programming interface (API) IDs 150, one or more system level agreements 152, one or more Kubernetes (also referred to as K8s) cluster commands 154 configured to control operations associated with one or more K8s clusters 155a and 155b (collectively, K8s clusters 155), one or more entitlements 156, one or more reports 158, and one or more network IDs 160 comprising one or more name-space IDs 162 and one or more slice group IDs 164. The network IDs 160 may relate the name-space IDs 162 and the slice group IDs 164 to one or more name-spaces or one or more slices. In the server memory 128, the server instructions 130 may comprise commands and controls for operating one or more specific NFs 108 in the core network 112 when executed by the server processing engine 122 of the server processor 120.

Herein, the multiple references to K8s clusters are non-limiting examples of containerized service clusters m configured as container orchestration platforms for scheduling and automating deployment, management, and scaling of containerized services (e.g., applications).

In one or more embodiments, the access commands 142 are configured to establish one or more communication sessions between two or more network components 114 in the core network 112. The access commands 142 may be configured to establish one or more communication sessions between one or more network components 114 in the core network 112 and one of the user equipment 116. Each configuration command of the access commands 142 may establish a communication session between a first network component of the network components 114 comprising the server 102 and a second network component of the network components 114 based at least in part upon a first configuration command of the access commands 142. The access commands 142 may be routing and configuration information for reinstating or reestablishing communication sessions when a change is detected in the operations of the core network 112. For example, in response to losing a specific communication session established with the first access command, the server 102 may attempt to reinstate the specific communication session based at least in part upon a second access command. The access commands 142 may be dynamically or periodically updated from another of the network components 114 in the core network 112. Herein, communication sessions refer to communication signals exchanged between the server 102 and additional network components 114 in the core network 112. In some embodiments, the access commands 142 are provided to the server 102 from another of the network components 114 performing a specific NF. The access commands 142 may be configured to enable access of the one or more services 106. The access commands 142 may be configured to enable access of one or more name-spaces (referenced in FIGS. 4A-8) and/or one or more slice groups referenced in FIG. 6) in a given K8s cluster.

The directories 134 may be configured to store service-specific information, tenant-specific information, and/or user-specific information. The directories 134 may enable the server 102 to confirm tenant credentials to access one or more network components (e.g., one of the network components 114 configured to perform the NRF 108a, an authentication server function (AUSF) 108b, an access and management function (AMF) 108c, one or more cloud network functions (CNFs) 108d, a policy control function (PCF) 108e, a unified data repository (UDR) 108f, a session management function (SMF) 108g, one or more Service Communication Proxys (SCPs) 108h, or the like) in the core network 112. The directories 134 may be configured to store the tenant profiles 136 and a reference to the one or more services 106. The directories 134 may be configured to store provider-specific information and service-specific information. The provider-specific information may enable the server 102 to validate credentials associated with a specific provider (e.g., one of the NFs 108) against corresponding user-specific information and service-specific information.

The requests 132 may be a communication or a message configured to indicate a request for access of an application (via an API) or a service 106. Further. The entitlements 156 may be configured to provide one or more connectivity allowances (e.g., access) between the server 102, the user equipment 116, the base stations 168, and one or more of the network components 114. The entitlements 156 may be assigned to specific departments or tenants. The entitlements 156 may be predefined or dynamically defined in accordance with the rules and policies 140. In the example of FIG. 1, while the entitlement 156a and the entitlements 156b are shown as part of the entitlements 156, the entitlements 156 may comprise less or more additional entitlements 156. The one or more reports 158 may be a communication or a message configured to indicate information to one or more of the network components 114, the base stations 168, and/or the user equipment 116.

The AFIDs 144 may be used for API authentication, service authorization, policies, and one or more system level agreements 152. The AFID 144 may enable the server 102 to authenticate a given API to specific tenants and one or groups or departments associated with the tenants. The service authorization, the policies, and the system level agreements 152 may be mapped to the tenant IDs 146, the department ID 148, and the API ID 150. The AFID 144 may enable onboarding processes that make mapping of APIs to tenants, and/or departments on the northbound side of a Common API Framework (CAPIF) and Network Exposure Function (NEF) in the core network 112. On the Southbound side of the NEF, the AFID 144 maps a set of slices to a tenant and/or a department through a slice differentiator (SD) field or information element of a Single Network Slice Selection Assistance Information (S-NSSAI). The SD field may comprise the slice-group ID 164 that indicates a specific tenant ID 146, department ID 148, and may comprise priority.

In some embodiments, the AFID 144 is an information element that comprises an availability between 50 characters and 150 characters. The tenant IDs 146 may reference one or more characters indicating a tenant associated with one of the tenant profiles 136. The department IDs 148 may be configured to reference one or more groups, sub-groups, or portions of a tenant or an organization associated with the tenant. The API IDs 150 may be configured to reference a specific API associated with any given departments of a given tenant. The access control list 138 (also referred to as ACL) may comprise rules that may allow or deny access to one or more of the entitlements 156 (e.g., a virtual environment). The rules and policies 140 may be security configuration commands or regulatory operations predefined by an organization or one or more users 129. In one or more embodiments, the rules and policies 140 may be dynamically defined by the one or more users 129. The one or more rules and policies 140 may be one or more a policy as defined in the 3GPP standards. The system level agreements 152 may be configured to define one or more levels of service 106 expected by a tenant, laying out the metrics by which that service 106 is measured, and the remedies or penalties, if any, should the agreed-on service levels not be achieved. The K8s cluster commands 154 may be configuration information and/or commands to control or modify K8s clusters 155 in the cores of the core network 112.

User Equipment

In one or more embodiments, each of the user equipment 116 may be any computing device configured to communicate with other devices, such as the server 102, other network components 114 in the core network 112, databases, and the like in the communication system 100. Each of the user equipment 116 may be configured to perform specific functions described herein and interact with one or more network components 114 in the core network 112 via one or more base stations 168a-168g (collectively, base stations 168). Examples of user equipment 116 comprise, but are not limited to, a laptop, a computer, a smartphone, a tablet, a smart device, an IoT device, a simulated reality device, an augmented reality device, or any other suitable type of device.

In one or more embodiments, referring to the user equipment 116A as a non-limiting example of the user equipment 116, the user equipment 116A may comprise a user equipment (UE) network interface 170, a UE I/O interface 172, a UE processor 174 executing operations via a UE processing engine 176, and a UE memory 178 comprising one or more instructions 180 configured to be executed by the UE processor 174. The UE network interface 170 may be any suitable hardware or software (e.g., executed by hardware) to facilitate any suitable type of communication in wireless or wired connections. These connections may comprise, but not be limited to, all or a portion of network connections coupled to additional network components 114 in the core network 112, the RAN 118, the Internet, an Intranet, a private network, a public network, a peer-to-peer network, the public switched telephone network, a cellular network, a local area network (LAN), a metropolitan area network (MAN), a wide area network (WAN), and a satellite network. The UE network interface 170 may be configured to support any suitable type of communication protocol.

The UE I/O interface 172 may be hardware configured to perform one or more communication operations. The UE I/O interface 172 may comprise one or more antennas as part of a transceiver, a receiver, or a transmitter for communicating using one or more wireless communication protocols or technologies. In some embodiments, the UE I/O interface 172 may be configured to communicate using, for example, 5G NR or LTE using at least some shared radio components. In other embodiments, the UE I/O interface 172 may be configured to communicate using single or shared RF bands. The RF bands may be coupled to a single antenna, or may be coupled to multiple antennas (e.g., for a MIMO configuration) to perform wireless communications. In some embodiments, the user equipment 116A may comprise capabilities for voice communication, mobile broadband services (e.g., video streaming, navigation, and the like), or other types of applications. In this regard, the UE I/O interface 172 of the user equipment 116A may communicate using machine-to-machine (M2M) communication, such as machine-type communication (MTC), or another type of M2M communication.

In some embodiments, the user equipment 116A is communicatively coupled to one or more of the base stations 168 via one or more communication links 190a-190g (e.g., collectively, communication links 190). The user equipment 116A may be a device with cellular communication capability such as a mobile phone, a hand-held device, a computer, a laptop, a tablet, a smart watch or other wearable device, or virtually any type of wireless device. In some applications, the user equipment 116 may be referred to as a UE, UE device, or terminal.

The UE processor 174 may comprise one or more processors operably coupled to and in signal communication with the UE network interface 170, the UE I/O interface 172, and the UE memory 178. The UE processor 174 is any electronic circuitry, including, but not limited to, state machines, one or more CPU chips, logic units, cores (e.g., a multi-core processor), FPGAs, ASICs, or DSPs. The UE processor 174 may be a programmable logic device, a microcontroller, a microprocessor, or any suitable combination of the preceding. The one or more processors in the UE processor 174 are configured to process data and may be implemented in hardware or software executed by hardware. For example, the UE processor 174 may be an 8-bit, a 16-bit, a 32-bit, a 64-bit, or any other suitable architecture. The UE processor 174 comprises an ALU to perform arithmetic and logic operations, processor registers that supply operands to the ALU, and store the results of ALU operations, and a control unit that fetches software instructions such as UE instructions 180 from the UE memory 178 and executes the UE instructions 180 by directing the coordinated operations of the ALU, registers, and other components via a UE processing engine 176. The UE processor 174 may be configured to execute various instructions. For example, the UE processor 174 may be configured to execute the UE instructions 180 to implement functions or perform operations disclosed herein, such as some or all of those described with respect to FIGS. 1-9. In some embodiments, the functions described herein are implemented using logic units, FPGAs, ASICs, DSPs, or any other suitable hardware or electronic circuitry.

Radio Access Network

In one or more embodiments, the RAN 118 enables the user equipment 116 to access one or more services in the core network 112. The one or more services may be a mobile telephone service, a Short Message Service (SMS) message service, a Multimedia Message Service (MMS) message service, an Internet access, cloud computing, or other types of data services. The RAN 118 may comprise the base stations 168 in signal communication with the user equipment 116 via the one or more communication links 190. Each of the base stations 168 may service the user equipment 116a-116g. In some embodiments, while multiple base stations 168 are shown connected to multiple user equipment 116 via the communication links 190, one or more additional base stations 168 may be connected to one or more additional user equipment 116 via one or more additional communication links 190. For example, the base stations 168a-168g may exchange connectivity signals with the user equipment 116a via the communication link 190a. In another example, the base station 168g may exchange connectivity signals with the user equipment 116g via the communication link 190g. In yet another example, the base stations 168 may service some user equipment 116 located within a geographic area serviced by one of the base In one or more embodiments, referring to the base station 168a as a non-limiting example of the base station 168, the base station 168a may comprise a base station (BS) network interface 182, a BS I/O interface 184, a BS processor 186, and a BS memory 188. The BS network interface 182 may be any suitable hardware or software (e.g., executed by hardware) to facilitate any suitable type of communication in wireless or wired connections between the core network 112 and the user equipment 116. These connections may comprise, but not be limited to, all or a portion of network connections coupled to additional network components 114 in the core network 112, other base stations 168, the user equipment 116, the Internet, an Intranet, a private network, a public network, a peer-to-peer network, the public switched telephone network, a cellular network, a LAN, a MAN, a WAN, and a satellite network. The BS network interface 182 may be configured to support any suitable type of communication protocol.

The BS I/O interface 184 may be hardware configured to perform one or more communication operations. The BS I/O interface 184 may comprise one or more antennas as part of a transceiver, a receiver, or a transmitter for communicating using one or more wireless communication protocols or technologies. In some embodiments, the BS I/O interface 184 may be configured to communicate using, for example, 5G NR or LTE using at least some shared radio components. In other embodiments, the BS I/O interface 184 may be configured to communicate using single or shared RF bands. The RF bands may be coupled to a single antenna, or may be coupled to multiple antennas (e.g., for a MIMO configuration) to perform wireless communications. In some embodiments, the base station 168a may allocate resources in accordance with one or more routing and configuration operations obtained from the core network 112. In some embodiments, resources may be allocated to enable capabilities in the user equipment 116 for voice communication, mobile broadband services (e.g., video streaming, navigation, and the like), or other types of applications.

In some embodiments, the base station 168a is communicatively coupled to one or more of the user equipment 116 via the one or more communication links 190. In some applications, the base stations 168 may be referred to as a BS, evolved Node B (eNodeB or eNB), a next generation Node B, gNodeB, gNB, or terminal.

The BS processor 186 may comprise one or more processors operably coupled to and in signal communication with the BS network interface 182, the BS I/O interface 184, and the BS memory 188. The BS processor 186 is any electronic circuitry, including, but not limited to, state machines, one or more CPU chips, logic units, cores (e.g., a multi-core processor), FPGAs, ASICs, or DSPs. The BS processor 186 may be a programmable logic device, a microcontroller, a microprocessor, or any suitable combination of the preceding. The one or more processors in the BS processor 186 are configured to process data and may be implemented in hardware or software executed by hardware. For example, the BS processor 186 may be an 8-bit, a 16-bit, a 32-bit, a 64-bit, or any other suitable architecture. The BS processor 186 comprises an ALU to perform arithmetic and logic operations, processor registers that supply operands to the ALU, and store the results of ALU operations, and a control unit that fetches software instructions (not shown) from the BS memory 188 and executes the software instructions by directing the coordinated operations of the ALU, registers, and other components via a processing engine (not shown) in the BS processor 186. The BS processor 186 may be configured to execute various instructions. For example, the BS processor 186 may be configured to execute the software instructions to implement functions or perform operations disclosed herein, such as some or all of those described with respect to FIGS. 1-9. In some embodiments, the functions described herein are implemented using logic units, FPGAs, ASICs, DSPs, or any other suitable hardware or electronic circuitry.

Core Network

The core network 112 may be a network configured to manage communication sessions for the user equipment 116. In one or more embodiments, the core network 112 may establish connections between user equipment 116 and a particular data network 110 in accordance with one or more communication protocols. As it will be described in reference to FIGS. 5A-9, the core network 112 may be a multi-core network 112 configured to comprise multiple cores. In this regard, the multi-core network may comprise multiple NFs 108 in each core. In the example of FIG. 1, the core network 112 comprises the network component 114a configured to perform the NRF 108a, the network component 114b configured to perform the AUSF 108b, the network component 114c configured to perform the AMF 108c, the network component 114d configured to perform the CNFs 108d, the network component 114e configured to perform the PCF 108e and the UDR 108f, and the network component 114f configured to perform the SMF 108g and the SCPs 108h. Herein, as a non-limiting example, while the NRF 108a is associated with the network component 114a, the core network 112 may comprise multiple network component 114 performing the NRF 108a. For example, a Unified Data Management (UDM) may be part of a core.

In some embodiments, the NRF 108a may comprise a service registration procedure that accesses the one or more databases to store or retrieve routing and configuration information associated with one or more network components 114 in the core network 112. The NRF 108a may access the database to discover services offered by other networks or other network components 114 with service discovery procedures and service authorization procedures. The NRF 108a may maintain a list of available NFs operations available in the core network 112 and any network components 114 associated with performing a given NF 108. The NRF 108a may also performs registration and discovery of service such that different NFs 108 may find each other via APIs. As an example, when the SMF 108g is registered to the NRF 108a, the SMF 108g is discoverable by the AMF 108c when the user equipment 116 attempts to access a given service type via the SMF 108g. In other embodiments, the NFs 108 may be connected via a communication bus to all other additional network elements in the core network 112. In the SBA, the NRF 108a may enable access between the user equipment 116 and the services offered via the NFs 108.

In one or more embodiments, the network components 114d performing the one or more CNFs 108d may be configured to operate multiple services associated with one or more services 106, while dynamically directing network traffic within the core network 112. In some embodiments, the network component 114f performing the SMF 108g may be configured to manage one or more communication sessions established between network components 114 of the core network 112, allocate and manage resource allocation routing for the user equipment 116, user plane selection, QoS and configuration enforcements for the control plane, service registration, discovery, establishment, and the like. In other embodiments, the network component 114c performing the AMF 108c may be configured to manage mobility, registration, connections, and overall access for the other network components 114 in the core network 112. The AMF 108c may act as an entry point for connections between the user equipment 116 and a given service. In yet other embodiments, the network component 114f performing the one or more SCPs 108h may be configured to provide a point of entry for a cluster of NFs 108 in the core network 112 to the user equipment 116 once the user equipment 116 are discovered by the NRF 108a. This allows the SCPs 108h to be delegated discovery points in the core network 112. The network component 114b performing the AUSF 108b may be configured to share performing of some of the aforementioned operations with a Unified Data Management (UDM) (not shown). In this regard, the AUSF 108b may be configured to perform authentication processes while the UDM manages user data for any other processes in the core network 112. In other embodiments, the UDM may receive requests for subscriber data from the SMF 108g, the AMF 108c, and the AUSF 108b before providing any services 106. The AUSF 108b may be implemented in one of the network components 114 configured to enable the AMF 108c to authenticate the user equipment 116. The network component 114e performing the PCF 108e may be configured to provide a policy control framework in which the rules and policies 140 are implemented in accordance with one or more application guidelines. In some embodiments, the PCF 108e may apply policy decisions to services provided, accessing subscription information, and the like to control behavior associated with the core network 112. The network component 114f performing the UDR 108f configured to operate as a centralized data repository for subscription data, subscriber policy data, session information, context information, and application states. In some embodiments, the UDR 108f may be configured to provide API integrations with other NFs 108 to retrieve subscriber subscription and policy data. The UDR 108f may notify other NFs 108 of changes in subscriber data, supports real-time or batch (e.g., bulk) data access provisioning and subscriber data provisioning, and manages service parameters and application data for advanced applications.

In some embodiments, the core network 112 enables the user equipment 116 to communicate with the server 102, or another type of device, located in a particular data network 110 or in signal communication with a particular data network 110. The core network 112 may implement a communication method that does not require the establishment of a specific communication protocol connection between the user equipment 116 and one or more of the data networks 110. The core network 112 may include one or more types of network devices (not shown), which may perform different NFs 108.

In some embodiments, the core network 112 may include a 5G NR or an LTE access network (e.g., an evolved packet core (EPC) network) among others. In this regards, the core network 112 may comprise one or more logical networks implemented via wireless connections or wired connections. Each logical network may comprise an end-to-end virtual network with dedicated power, storage, or computation resources. Each logical network may be configured to perform a specific application comprising individual policies, rules, or priorities. Further, each logical network may be associated with a particular Quality of Service (QoS) class, type of service, or particular user associated with one or more of the user equipment 116. For example, a logical network may be a Mobile Private Network (MPN) configured for a particular organization. In this example, when the user equipment 116a is configured and activated by a wireless network associated with the RAN 118, the user equipment 116a may be configured to connect to one or more particular network slices (i.e., logical networks) in the core network 112. Any logical networks or slices that may be configured for the user equipment 116a may be configured using one of the network components 114 of FIG. 1 performing a Network Slice Selection Function (NSSF) that may store a subscription profile associated with the user equipment 116a, in a network component operating as a Unified Data Management (UDM). Further, when the user equipment 116a may request a connection to a particular logical network or slice, the user equipment 116a may send a request to the network component performing the AMF 108c. The AMF 108c may provide a list of allowed logical networks or slices to the user equipment 116a. The user equipment 116a may then request a Packet Data Unit (PDU) connection with one or more of the provided logical networks or slices.

Data Networks

In the example system 100 of FIG. 1, the data networks 110 may facilitate communication within the communication system 100. This disclosure contemplates that the data networks 110 may be any suitable network operable to facilitate communication between the server 102, the core network 112, the RAN 118, and the user equipment 116. The data networks 110 may include any interconnecting system capable of transmitting audio, video, signals, data, messages, or any combination of the preceding. The data networks 110 may include all or a portion of a LAN, a WAN, an overlay network, a software-defined network (SDN), a virtual private network (VPN), a packet data network (e.g., the Internet), a mobile telephone network (e.g., cellular networks, such as 4G or 5G), a Plain Old Telephone (POT) network, a wireless data network (e.g., WiFi, WiGig, WiMax, and the like), a Long Term Evolution (LTE) network, a Universal Mobile Telecommunications System (UMTS) network, a peer-to-peer (P2P) network, a Bluetooth network, a Near Field Communication network, a Zigbee network, or any other suitable network, operable to facilitate communication between the components of the communication system 100. In other embodiments, the communication system 100 may not have all of these components or may comprise other elements instead of, or in addition to, those above.

Application Function Identifier Structures

FIGS. 2A and 2B illustrate example structures associated with the AFID in accordance with one or more embodiments. In the example of FIG. 2A, an AFID structure 200a is shown comprising a number of AFID characters divided into a number of M characters corresponding to a tenant ID 202, a number of N characters corresponding to a department ID 204, and a number of K characters corresponding to an API ID 206. In the example of FIG. 2B, an AFID structure 200b is shown comprising a number of AFID characters divided into a number of P characters corresponding to a tenant ID 252, a number of Q characters corresponding to a department ID 254, and a number of O characters corresponding to an API ID 256. Further, the length of each field may be variable by using any character or symbol (e.g., dash symbol, dot character, space, underscore character or the like) between the fields (e.g., TENANT1-DEPARTMENT6-API7"). In some embodiments, the length of each field may be modified by using abbreviation, short phrases, or nicknames for the tenant IDs 146, the department IDs 148, and/or the API IDs 150 (e.g., "TEN1.DEPT1.API1" using nickname "TENT1" for a specific tenant ID 146 and abbreviation "DEPT1" for a specific department ID 148).

In FIG. 2A, as a non-limiting representative example, the number of AFID characters in the AFID structure 200a may be 100 characters, the number of M characters may be 50 characters, the number of N characters may be 35 characters, and the number of K characters may be 15 characters. The number of M characters, the number of N characters, and the number of K characters may be modified such that they comprise different values that, when added together, remain within a total of 100 characters available in the AFID characters.

In FIG. 2B, as a non-limiting representative example, the number of AFID characters in the AFID structure 200b may be 120 characters, the number of P characters may be 50 characters, the number of Q characters may be 40 characters, and the number of O characters may be 30 characters. The number of P characters, the number of Q characters, and the number of O characters may be modified such that they comprise different values that, when added together, remain within a total of 120 characters available in the AFID characters.

In some embodiments, the number of AFID characters may be modified in accordance with the rules and policies 140. For example, the number of AFID characters may be variable to be between 200 characters and 3 characters, inclusive. The number of AFID characters may be a number of available characters. In this regard, the AFID may comprise less characters than those available when referencing a specific API. For example, the AFID "TENANT6.DEPARTMENT2.API9" may be mapped to reference or access an API named "API9" to be operated in accordance with entitlements granted to a department named "DEPARTMENT2" of a tenant named "TENANT6." In this example, while the number of characters in the AFID "TENANT6.DEPARTMENT2.API9" is equal to 22 characters (excluding the periods), the number of AFID characters available may remain 100 characters. Further, the number of characters occupied by tenant IDs 146, the department IDs 148, and the API IDs 150 in a given AFID may be different or equal to one another. For example, a number of AFID characters may be 90 characters with 30 characters corresponding to each of the tenant IDs 146, the department IDs 148, and the API IDs 150. In another example, a number of AFID characters may be 170 characters with 50 characters corresponding to the tenant IDs 146, 100 characters corresponding to the department IDs 148, and 20 characters corresponding to the API IDs 150.

Application Function Identifier Mappings Operations

FIG. 3 illustrates examples of multiple AFID mapping operations 300, in accordance with one or more embodiments. The AFID mapping operations 300 are shown in a table form where example entitlements 156a-156d to multiple AFIDs are mapped to AFIDs 310-320. Each AFID 144 of the AFIDs 310-320 is divided into a Tenant-ID, a Department-ID, and an API-ID corresponding to one or more entitlements example 156a-156d.

As a non-limiting example, the entitlement 156a comprises access to monitoring information, the entitlement 156b comprises event controls, the entitlement 156c comprises directory management, and the entitlement 156d comprises system access. As described above, the entitlements 156a-156d may be accessed by one or more tenants, one or more departments, and one or more APIs. The entitlements 156a-156d may be unique to each API. For example, one API may comprise a first version of the entitlement 156a and another API may comprise a second version of the entitlement 156a. Further, the entitlements 156a-156d may be different depending on the tenant ID 146 and/or the department ID 148. In the example of FIG. 3, the server 102 may receive a first request with an AFID 310 comprising "TENANT1.DEPARTMENT1.APPLICATION1" requesting access to a first API in accordance with the entitlements 156 for a first department of a first tenant. The entitlements 156 may comprise access to the entitlement 156a for the first department of the first tenant. The server 102 may receive a second request with an AFID 312 comprising "TENANT1.DEPARTMENT2.APPLICATION2" requesting access to a second API in accordance with the entitlements 156 for a second department of the first tenant. The entitlements 156 may comprise access to the entitlement 156b and the entitlement 156c for the second department of the first tenant. The server 102 may receive a request with an AFID 314 comprising "TENANT1.DEPARTMENT2.APPLICATION3" requesting access to a third API in accordance with the entitlements 156 for the second department of the first tenant. The entitlements 156 may comprise access to the entitlement 156a and the entitlement 156d for the second department of the first tenant. The server 102 may receive a request with an AFID 316 comprising "TENANT1.DEPARTMENT3.APPLICATION3" requesting access to the third API in accordance with the entitlements 156 for the third department of the first tenant. The entitlements 156 may comprise access to the entitlement 156a and the entitlement 156d for the third department of the first tenant. Further, the server 102 may receive a request with an AFID 320 comprising "TENANT2.DEPARTMENT1. APPLICATION1" requesting access to a first API in accordance with the entitlements 156 for a first department of a second tenant. The entitlements 156 may comprise access to the entitlement 156a for the first department of the second tenant.

In one or more embodiments, for a tenant with no departments, the department ID 148 may be set to "NULL" (e.g., code "0x00," code "0," a configured character symbol, or an empty space). In some embodiments, all the departments may be selected in a specific tenant. In this regard, the department ID 148 may be set to "ALL," a specific symbol (e.g., code "FxFF", or a configured character symbol "*") to reference all the department IDs 148 associated with a specific tenant. As a non-limiting example in reference to FIG. 3, all department entitlements for the first tenant may be selected in the AFID 144 set to "TENANT1.ALL.API1" for an API1. In some embodiments, this AFID 144 structure may help to map an API to an appropriate tenant and/or department during an onboarding process. In other embodiments, the architecture may use the tenant IDs 146 and the API IDs 150 only without the department IDs 148.

In one or more embodiments, the example of FIG. 3 comprises an access control list 133 in which event type(s) associated with an API are mapped hierarchically in accordance with the tiers provided by entitlements at an API level, a department level, and a tenant level. One column may represent the AFID 144 and the other columns represent event types such as those described in technical specifications of the 3GPP standards. After proper authentication, relevant personnel of a tenant may obtain access to the fields associated with the event types in the access control list 133. Similar to the example of FIG. 3, AFIDs 144 may be mapped to the rules and policies 140 (e.g., policy controls as defined in the 3GPP standards) and the system level agreements 152.

Example Process to Map Hierarchical Multi-Tenant Access to Services

FIG. 4 illustrates an example flowchart of a process 400 to map hierarchical multi-tenant access to the services, in accordance with one or more embodiments. In one or more embodiments, the process 400 comprises operations 402-414. Modifications, additions, or omissions may be made to the process 400. The process 400 may include more, fewer, or other operations than those shown below. For example, operations may be performed in parallel or in any suitable order. While at times discussed as the server 102, one or more of the user equipment 116, components of any of thereof, or any suitable system or components of the communication system 100 may perform one or more operations of the process 400. For example, one or more operations of the process 400 may be implemented, at least in part, in the form of server instructions 130 of FIG. 1, stored on non-transitory computer readable media, tangible media, machine-readable media (e.g., server memory 128 of FIG. 1 operating as a non-transitory computer readable medium) that when run by one or more processors (e.g., the server processor 120 of FIG. 1) may cause the one or more processors to perform operations described in operations 402-414 of the process 400.

The process 400 starts at operation 402, where the server 102 receives an incoming request 132 to access one or more services 106. At operation 304, the server 102 determines an AFID 144 in the incoming request 132. The AFID 144 may comprise multiple characters corresponding to a tenant ID 146, multiple characters corresponding to an department ID 148, and multiple characters corresponding to an API ID 150. As described above, the AFID 144 is an information element that comprises an availability between 50 characters and 150 characters. At operation 306, the server 102 extrapolates the tenant ID 146, the department ID 148, and the API ID 150 from the AFID 144.

The process 400 continues at operation 410, where the server 102 is configured to determine whether the tenant ID 146, the department ID 148, and the API ID 150 match information in the directories 134. If the server 102 determines that the identifiers does not match information in the directories 134 (i.e., NO), the process 400 proceeds to operation 412. At operation 412, the server 102 indicates that the AFID 144 does not match the information in the directories 134 as an alert. The alert may be a visual alert or a sound alert presented to one or more users 129 via a corresponding user equipment 116. If the server 102 determines that the identifiers match information in the directories 134 (i.e., YES), the process 400 proceeds to operation 414.

In this case, the process 400 may conclude at operation 414, where the server 102 provides network access commands 142 indicating access to one or more entitlements 156 that match the tenant ID 146, the department ID 148, and the API ID 150. The server 102 may be configured to generate a report 158 (e.g., a signal or a communication) indicating or comprising information indicating the network access commands 142. In this regard, the server 102 may present the report 158 to a user equipment 116 configured to access the service 106 based at least in part upon the network access commands 142 in the report 158.

Name-Space for Multi-Tenancy

FIGS. 5A and 5B show examples of K8s clusters 155, in accordance with one or more embodiments. FIG. 5A shows a K8s cluster 500a comprising multiple name-spaces 502-524 and multiple cores 542 and 544. FIG. 5B shows a K8s cluster 500b comprising one name-space 552 and a core 572.

In the example of FIG. 5A, as a non-limiting representative example, the K8s cluster 500a comprises multiple NFs 108 separated into a core 542 and a core 544. In FIG. 5A, each of the name-spaces 502-524 is mapped to the core 542 or the core 544. In some embodiments, the name-space IDs 162 may reference one of the name-spaces 502-524 to access one NF 108 or multiple NFs 108 (e.g., a function set 530). The core 542 comprises a name-space 502, a name-space 512, and a name-space 514. The name-space 502 may be referenced to access an AMF 548a and a SMF 548b in the core 542, the name-space 512 may be referenced to access the AMF 548a in the core 542, and the name-space 514 may be referenced to access the SMF 548b in the core 542. In some embodiments, the network access commands 142 may be configured to provide access to the AMF 548a and/or the SMF 548b via the name-space 502, the name-space 512, and the name-space 514. The core 544 comprises a name-space 504, a name-space 522, and a name-space 524. The name-space 504 may be referenced to access an AMF 548c, an AMF 548d, a SMF 548e, and a SMF 548f in the core 544, the name-space 522 may be referenced to access the AMF 548c and the AMF 548d in the core 544, and the name-space 524 may be referenced to access the SMF 548e and the SMF 548f in the core 544. In some embodiments, the network access commands 142 may be configured to provide access to the AMF 548c, the AMF 548d, the SMF 548e, and/or the SMF 548f via the name-space 504, the name-space 522, and the name-space 524. Further, the network access commands 142 may be configured to provide access to the AMF 548c and/or the AMF 548d in the function set 530.

In the example of FIG. 5B, as a non-limiting representative example, the K8s cluster 500b comprises multiple NFs 108 in a single core 572. In FIG. 5B, the name-space 552 is mapped to the core 572. In some embodiments, the name-space IDs 162 may reference the name-space 552 to access a portion of the NFs 108 (e.g., a function set 560) or all the NFs 108. The name-space 552 may be referenced to access an AMF 548g, an AMF 548h, an AMF 548i, a SMF 548j, a SMF 548k, and a SMF 548l in the core 572. In some embodiments, the network access commands 142 may be configured to provide access to the AMF 548g, the AMF 548h, the AMF 548i, the SMF 548j, the SMF 548k, and the SMF 548l in the core 572 via the name-space 552. Further, the network access commands 142 may be configured to provide access to the AMF 548g, the AMF 548h, and/or the AMF 548i in the function set 560.

In one or more embodiments, while the K8s cluster 500a and the K8s cluster 500b show certain NFs 108, the K8s cluster 500a and the K8s cluster 500b may comprise less or more NFs 108. The AMF 548a, the AMF 548c, the AMF 548d, and the AMFs 548g-548i may perform one or more operations similar to those described in reference to the AMF 108c of FIG. 1. The SMF 548b, the SMF 548e, the SMF 548f, and the SMFs 548j-548l may perform one or more operations similar to those described in reference to the SMF 108g of FIG. 1.

Name-Space and Slice Group for Hierarchical Multi-Tenancy

FIG. 6 show an example of a K8s cluster 155, in accordance with one or more embodiments. FIG. 6 shows a K8s cluster 600 comprising multiple name-spaces 602-624, multiple slice groups in slices 630-640, and multiple cores 652 and 654. In the example of FIG. 6, as a non-limiting representative example, the K8s cluster 600 comprises multiple NFs 108 separated into a core 652 and a core 654. In FIG. 6, each of the name-spaces 602-624 is mapped to the core 652 or the core 654. In some embodiments, the name-space IDs 162 may reference one of the name-spaces 602-624 to access one NF 108 or multiple NFs 108.

The core 652 comprises a name-space 602, a name-space 612, and a name-space 614. Further, the core 652 comprises a slice 630 and a slice 632. The name-space 602 may be referenced to access the slice 630 or the slice 632 in an AMF 648a and a SMF 648b in the core 652, the name-space 612 may be referenced to access the slice 630 or the slice 632 in the AMF 648a in the core 652, and the name-space 614 may be referenced to access the slice 630 or the slice 632 in the SMF 648b in the core 652. In some embodiments, the network access commands 142 may be configured to provide access to the AMF 648a and/or the SMF 648b via the name-space 602, the name-space 612, and the name-space 614. One or more specific operations associated with a given NF 108 may be accessed via the slice 630 and the slice 632. As a non-limiting example, the slice 630 may be configured in accordance with entitlements 156 for a Slice-Group-1 that may be assigned to a first department of a first tenant and the slice 632 may be configured in accordance with entitlements 156 for a Slice-Group-2 that may be assigned to a second department of a second tenant.

The core 654 comprises a name-space 604, a name-space 622, and a name-space 624. Further, the core 654 comprises a slice 634, a slice 636, and a slice 640. The name-space 604 may be referenced to access the slice 634, the slice 636, and the slice 640 in an AMF 648c, an AMF 648d, a SMF 648e, and a SMF 648f in the core 654, the name-space 622 may be referenced to access the slice 634, the slice 636, or the slice 640 in the AMF 648c and the AMF 648d in the core 654, and the name-space 624 may be referenced to access the slice 634, the slice 636, or the slice 640 in the SMF 648e and the SMF 648f in the core 654. In some embodiments, the network access commands 142 may be configured to provide access to the slice 634, the slice 636, and the slice 640 of the AMF 648c, the AMF 648d, the SMF 648e, and/or the SMF 648f via the name-space 604, the name-space 622, and the name-space 624. One or more specific operations associated with a given NF 108 may be accessed via the slice 634, the slice 636, and the slice 640. As a non-limiting example, the slice 634 may be configured in accordance with entitlements 156 for a Slice-Group-3 that may be assigned to a first department of the second tenant, the slice 636 may be configured in accordance with entitlements 156 for a Slice-Group-4 that may be assigned to the second department of the second tenant, and the slice 640 may be configured in accordance with entitlements 156 for a Slice-Group-5 that may be assigned to a third department of the second tenant.

Multi-Tenancy in Same Name-Spaces with Multiple Kubernetes Clusters

FIGS. 7A and 7B show examples of K8s clusters 155, in accordance with one or more embodiments. FIG. 7A shows a K8s cluster 700a comprising multiple name-spaces 702-724 and multiple cores 742 and 744. FIG. 7B shows a K8s cluster 700b comprising multiple name-spaces 702, 704, 752, and 754 and the same cores 742 and 744 of the FIG. 7A.

In the example of FIG. 7A, as a non-limiting representative example, the K8s cluster 700a comprises multiple NFs 108 separated into a core7 and a core 744. In FIG. 7A, each of the name-spaces 702-724 is mapped to the core 742 or the core 744. In some embodiments, the name-space IDs 162 may reference one of the name-spaces 702-724 to access one NF 108 or multiple NFs 108. The core 742 comprises a name-space 702, a name-space 712, and a name-space 714. The name-space 702 may be referenced to access an AMF 748a and a SMF 748b in the core 742, the name-space 712 may be referenced to access the AMF 748a in the core 742, and the name-space 714 may be referenced to access the SMF 748b in the core 742. In some embodiments, the network access commands 142 may be configured to provide access to the AMF 748a and/or the SMF 748b via the name-space 702, the name-space 712, and the name-space 714. The core 744 comprises a name-space 704, a name-space 722, and a name-space 724. The name-space 704 may be referenced to access an AMF 748c, an AMF 748d, a SMF 748e, and a SMF 748f in the core 744, the name-space 722 may be referenced to access the AMF 748c and the AMF 748d in the core 744, and the name-space 724 may be referenced to access the SMF 748e and the SMF 748f in the core 744. In some embodiments, the network access commands 142 may be configured to provide access to the AMF 748c, the AMF 748d, the SMF 748e, and/or the SMF 748f via the name-space 704, the name-space 722, and the name-space 724.

In the example of FIG. 7B, as a non-limiting representative example, the K8s cluster 700b comprises multiple NFs 108 separated into the core 742 and the core 744. In FIG. 7B, the name-space 752 is mapped to the core 772. In some embodiments, the name-space IDs 162 may reference the name-space 702, the name-space 704, the name-space 752, and the name-space 762 to access a portion of the NFs or all the NFs 108. The name-space 702 may be referenced to access an AMF 548g, an AMF 548h, an AMF 548i, AMF 748a, the SMF 748b, and a UPF 748g in the core 742, the name-space 704 may be referenced to access the AMF 748c, the AMF 748d, the SMF 748e, the SMF 748f, a UPF 748h, and a UPF 748i in the core 742, the name-space 752 may be referenced to access the UPF 748g in the core 742, and name-space 762 may be referenced to access the UPF 748h and the UPF 748i in the core 744.

In one or more embodiments, while the K8s cluster 700a and the K8s cluster 700b show certain NFs 108, the K8s cluster 700a and the K8s cluster 700b may comprise less or more NFs 108. The AMF 748*a*, the AMF 748*c*, and the AMF 748*d* may perform one or more operations similar to those described in reference to the AMF 108*c* of FIG. 1. The SMF 748*b*, the SMF 748*e*, and the SMF 748*f* may perform one or more operations similar to those described in reference to the SMF 108*g* of FIG. 1. The UPF 748*g*, the UPF 748*h*, and the UPF 748*i* may be configured to connect data coming over the RAN 118 to the data networks 110. In some embodiments, the UPF 222, UPF 748*g*, the UPF 748*h*, and the UPF 748*i* may be able to route data packets to correct destinations on the data networks 110.

Shared Network Functions in One or More Cores

FIGS. 8A and 8B show examples of K8s clusters 155, in accordance with one or more embodiments. [FIG. 8A shows a K8s cluster 800*a* comprising multiple name-spaces 802-824 and multiple cores 842 and 844. FIG. 8B shows a K8s cluster 800*b* comprising one name-space 850 and a core 852.

In the example of FIG. 8A, as a non-limiting representative example, the K8s cluster 800*a* comprises multiple NFs 108 separated into a core 842 and a core 844. In FIG. 8A, each of the name-spaces 802-824 is mapped to the core 842 or the core 844. In some embodiments, the name-space IDs 162 may reference one of the name-spaces 802-824 to access one NF 108 or multiple NFs 108. The core 842 comprises a name-space 802, a name-space 812, and a name-space 814. The name-space 802 may be referenced to access an AMF 848*a* and a SMF 848*b* in the core 842, the name-space 812 may be referenced to access the AMF 848*a* in the core 842, and the name-space 814 may be referenced to access the SMF 848*b* in the core 842. In some embodiments, the network access commands 142 may be configured to provide access to the AMF 848*a* and/or the SMF 848*b* via the name-space 802, the name-space 812, and the name-space 814. The core 844 comprises a name-space 804, a name-space 822, and a name-space 824. The name-space 804 may be referenced to access an AMF 848*c*, an AMF 848*d*, a SMF 848*e*, and a SMF 848*f* in the core 844, the name-space 822 may be referenced to access the AMF 848*c* and the AMF 848*d* in the core 844, and the name-space 824 may be referenced to access the SMF 848*e* and the SMF 848*f* in the core 844. In some embodiments, the network access commands 142 may be configured to provide access to the AMF 848*c*, the AMF 848*d*, the SMF 848*e*, and/or the SMF 848*f* via the name-space 804, the name-space 822, and the name-space 824. Further, the network access commands 142 may be configured to provide access to the AMF 848*c* and/or the AMF 848*d* in a function set 830.

In the example of FIG. 8B, as a non-limiting representative example, the K8s cluster 800*b* comprises multiple NFs 108 in a single core 872. In FIG. 8B, the name-space 802 and the name-space 804 are mapped to the core 872. In some embodiments, the name-space IDs 162 may reference the name-space 802 and the name-space 804 to access a portion of the NFs 108 or all the NFs 108. The name-space 802 and the name-space 804 may be referenced to access an NRF 848*g*, a PCF 848*h*, and a UDR 848*i* in the core 872. In some embodiments, the network access commands 142 may be configured to provide access to the NRF 848*g*, the PCF 848*h*, and/or the UDR 848*i* in the core 872 via the name-space 802 and the name-space 804. Further, the network access commands 142 may be configured to provide access to the NRF 848*g*, the PCF 848*h*, and/or the UDR 848*i*. In this regard, the K8s cluster 800*b* may be a single cluster shared by multiple name-spaces and comprising NFs 108 associated with multiple cores. For example, the core 872, may be a combined extension of the core 842 and the core 844 of FIG. 8A.

In one or more embodiments, while the K8s cluster 800*a* and the K8s cluster 800*b* show certain NFs 108, the K8s cluster 800*a* and the K8s cluster 800*b* may comprise less or more NFs 108. The NRF 848*g* may perform one or more operations similar to those described in reference to the NRF 108*a* of FIG. 1. The PCF 848*h* may perform one or more operations similar to those described in reference to the PCF 108*e* of FIG. 1. The UDR 848*i* may perform one or more operations similar to those described in reference to the UDR 108*f* of FIG. 1.

Example Process to Implement Name-Spaces in Hierarchical Multi-Tenant Containerized Service Clusters FIG. 9 illustrates an example flowchart of a process 900 to implement name-spaces in hierarchical multi-tenant k8s clusters, in accordance with one or more embodiments. In one or more embodiments, the process 900 comprises operations 902-414. Modifications, additions, or omissions may be made to the process 900. The process 900 may include more, fewer, or other operations than those shown below. For example, operations may be performed in parallel or in any suitable order. While at times discussed as the server 102, one or more of the user equipment 116, components of any of thereof, or any suitable system or components of the communication system 100 may perform one or more operations of the process 900. For example, one or more operations of the process 900 may be implemented, at least in part, in the form of server instructions 130 of FIG. 1, stored on non-transitory computer readable media, tangible media, machine-readable media (e.g., server memory 128 of FIG. 1 operating as a non-transitory computer readable medium) that when run by one or more processors (e.g., the server processor 120 of FIG. 1) may cause the one or more processors to perform operations described in operations 902-914 of the process 900.

The process 900 starts at operation 902, where the server 102 receives an incoming request 132 to access a network function 108 in a K8 cluster 155. At operation 904, the server 102 determines a tenant profile 136 and a name-space ID 162 in the incoming request. The request 132 may comprise one or more network IDs 160 associated with one or more name-space IDs 162 and/or one or more slice group IDs 164. At operation 906, the server 102 determine network functions 108 associated with the tenant profile 136 and the name-space ID 162. The name-space ID 162 may indicate a name-space (e.g., name-spaces 502-524 of FIG. 5) located in a K8s cluster 155.

The process 900 continues at operation 910, where the server 102 is configured to determine whether the tenant profile 136 is entitled to access the name-space. In this regard, the server 102 may determine network access commands 142 based at least in part upon the tenant profile 136 and the name-space ID 162. The network access commands 142 may be configured to provide access to one or more entitlements 156 and enable access to the name-space in the K8s cluster 155. If the server 102 determines that the tenant profile is not entitled to access the name-space (i.e., NO), the process 900 proceeds to operation 912. At operation 912, the server 102 indicates that the tenant profile is not entitled to access a name-space corresponding to the name-space ID as an alert. The alert may be a visual alert or a sound alert presented to one or more users 129 via a corresponding user equipment 116. If the server 102 determines that the tenant profile is entitled to access the name-space (i.e., YES), the process 900 proceeds to operation 914.

In this case, the process 900 may conclude at operation 914, where the server 102 provides access commands indicating access to one or more K8s cluster that matches the name-space ID. The server 102 may be configured to generate a report 158 (e.g., a signal or a communication) indicating or comprising information indicating the network access commands 142. In this regard, the server 102 may present the report 158 to a user equipment 116 configured to access the service 106 based at least in part upon the network access commands 142 in the report 158.

Scope of the Disclosure

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. An apparatus, comprising:
a memory, comprising:
one or more directories comprising access to a plurality of tenant profiles, each tenant profile of the plurality of tenant profiles being associated with one or more services of a plurality of services; and
one or more network access commands configured to provide access to one or more entitlements; and
a processor communicatively coupled to the memory and configured to:
receive a first request to access at least one service of the plurality of services, the first request comprising a first application function identifier (AFID);
extrapolate a first tenant identifier (ID), a first department ID, and a first application programming interface (API) ID from the first AFID, wherein:
the first tenant ID references a first tenant profile of the plurality of tenant profiles;
the first department ID references a first plurality of entitlements associated with the first tenant profile; and
the first API ID references a first service associated with the first plurality of entitlements;
determine a first plurality of network access commands configured to enable access to the first service in accordance with the first plurality of entitlements; and
generate a first report comprising the first plurality of network access commands.

2. The apparatus of claim 1, wherein the AFID comprises a first plurality of characters corresponding to the tenant ID, a second plurality of characters corresponding to the first department ID, and a third plurality of characters corresponding to the API ID.

3. The apparatus of claim 1, wherein the AFID is an information element that comprises an availability between 50 characters and 150 characters.

4. The apparatus of claim 1, wherein the processor is further configured to:
receive a second request comprising a second AFID;
extrapolate a second tenant ID, a second department ID, and a second API ID from the second AFID, wherein:
the second tenant ID references a second tenant profile of the plurality of tenant profiles;
the second department ID references a second plurality of entitlements associated with the second tenant profile; and
the second API ID references a second service and a third service associated with the second plurality of entitlements;
determine a second plurality of network access commands configured to enable access to the second service in accordance with the second plurality of entitlements and a third plurality of network access commands configured to enable access to the third service in accordance with the second plurality of entitlements; and
generate a second report comprising the second plurality of network access commands and the third plurality of network access commands.

5. The apparatus of claim 1, wherein the processor is further configured to:
receive a second request comprising a second AFID;
extrapolate a second tenant ID, a second department ID, and a second API ID from the second AFID, wherein:
the second tenant ID references a second tenant profile of the plurality of tenant profiles;
the second department ID references a second plurality of entitlements and a third plurality of entitlements associated with the second tenant profile; and
the second API ID references a second service associated with the second plurality of entitlements and the third plurality of entitlements;
determine a second plurality of network access commands configured to enable access to the second service in accordance with the second plurality of entitlements and the third plurality of entitlements; and
generate a second report comprising the second plurality of network access commands.

6. The apparatus of claim 1, wherein the processor is further configured to:
receive a second request comprising a second AFID;
extrapolate a second tenant ID and a second API ID from the second AFID, wherein:
the second tenant ID references a second tenant profile of the plurality of tenant profiles; and
the second API ID references a second service associated with the second tenant ID;
determine a second plurality of network access commands configured to enable access to the second service in accordance with a second plurality of entitlements corresponding to the second tenant profile; and
generate a second report comprising the second plurality of network access commands.

7. The apparatus of claim 1, wherein the processor is further configured to present the first report to a user equipment, the user equipment being configured to access the first service based at least in part upon the first plurality of network access commands in the first report.

8. A method, comprising:
receiving a first request to access at least one service of a plurality of services, the first request comprising a first application function identifier (AFID);
extrapolating a first tenant identifier (ID), a first department ID, and a first application programming interface (API) ID from the first AFID, wherein:
the first tenant ID references a first tenant profile of the plurality of tenant profiles;
the first department ID references a first plurality of entitlements associated with the first tenant profile; and
the first API ID references a first service associated with the first plurality of entitlements;
determining a first plurality of network access commands configured to provide access to one or more entitlements and enable access to the first service in accordance with the first plurality of entitlements; and
generating a first report comprising the first plurality of network access commands.

9. The method of claim 8, wherein the AFID comprises a first plurality of characters corresponding to the tenant ID, a second plurality of characters corresponding to the first department ID, and a third plurality of characters corresponding to the API ID.

10. The method of claim 8, wherein the AFID is an information element that comprises an availability between 50 characters and 150 characters.

11. The method of claim 8, further comprising:
receiving a second request comprising a second AFID;
extrapolating a second tenant ID, a second department ID, and a second API ID from the second AFID, wherein:
the second tenant ID references a second tenant profile of the plurality of tenant profiles;
the second department ID references a second plurality of entitlements associated with the second tenant profile; and
the second API ID references a second service and a third service associated with the second plurality of entitlements;
determining a second plurality of network access commands configured to enable access to the second service in accordance with the second plurality of entitlements and a third plurality of network access commands configured to enable access to the third service in accordance with the second plurality of entitlements; and
generating a second report comprising the second plurality of network access commands and the third plurality of network access commands.

12. The method of claim 8, further comprising:
receiving a second request comprising a second AFID;
extrapolating a second tenant ID, a second department ID, and a second API ID from the second AFID, wherein:
the second tenant ID references a second tenant profile of the plurality of tenant profiles;
the second department ID references a second plurality of entitlements and a third plurality of entitlements associated with the second tenant profile; and
the second API ID references a second service associated with the second plurality of entitlements and the third plurality of entitlements;
determining a second plurality of network access commands configured to enable access to the second service in accordance with the second plurality of entitlements and the third plurality of entitlements; and
generating a second report comprising the second plurality of network access commands.

13. The method of claim 8, further comprising:
receiving a second request comprising a second AFID;
extrapolating a second tenant ID and a second API ID from the second AFID, wherein:
the second tenant ID references a second tenant profile of the plurality of tenant profiles; and
the second API ID references a second service associated with the second tenant ID;
determining a second plurality of network access commands configured to enable access to the second service in accordance with a second plurality of entitlements corresponding to the second tenant profile; and
generating a second report comprising the second plurality of network access commands.

14. The method of claim 8, further comprising presenting the first report to a user equipment, the user equipment being configured to access the first service based at least in part upon the first plurality of network access commands in the first report.

15. A non-transitory computer readable medium storing instructions that when executed by a processor cause the processor to:
receive a first request to access at least one service of a plurality of services, the first request comprising a first application function identifier (AFID);
extrapolate a first tenant identifier (ID), a first department ID, and a first application programming interface (API) ID from the first AFID, wherein:
the first tenant ID references a first tenant profile of the plurality of tenant profiles;
the first department ID references a first plurality of entitlements associated with the first tenant profile; and
the first API ID references a first service associated with the first plurality of entitlements;
determine a first plurality of network access commands configured to provide access to one or more entitlements and enable access to the first service in accordance with the first plurality of entitlements; and
generate a first report comprising the first plurality of network access commands.

16. The non-transitory computer readable medium of claim 15, wherein the AFID comprises a first plurality of characters corresponding to the tenant ID, a second plurality of characters corresponding to the department ID, and a third plurality of characters corresponding to the API ID.

17. The non-transitory computer readable medium of claim 15, wherein the AFID is an information element that comprises an availability between 50 characters and 150 characters.

18. The non-transitory computer readable medium of claim 15, wherein the processor is further caused to:
receive a second request comprising a second AFID;
extrapolate a second tenant ID, a second department ID, and a second API ID from the second AFID, wherein:
the second tenant ID references a second tenant profile of the plurality of tenant profiles;
the second department ID references a second plurality of entitlements associated with the second tenant profile; and
the second API ID references a second service and a third service associated with the second plurality of entitlements;

determine a second plurality of network access commands configured to enable access to the second service in accordance with the second plurality of entitlements and a third plurality of network access commands configured to enable access to the third service in accordance with the second plurality of entitlements; and generate a second report comprising the second plurality of network access commands and the third plurality of network access commands.

19. The non-transitory computer readable medium of claim 15, wherein the processor is further caused to:

receive a second request comprising a second AFID;

extrapolate a second tenant ID, a second department ID, and a second API ID from the second AFID, wherein:

the second tenant ID references a second tenant profile of the plurality of tenant profiles;

the second department ID references a second plurality of entitlements and a third plurality of entitlements associated with the second tenant profile; and the second API ID references a second service associated with the second plurality of entitlements and the third plurality of entitlements;

determine a second plurality of network access commands configured to enable access to the second service in accordance with the second plurality of entitlements and the third plurality of entitlements; and generate a second report comprising the second plurality of network access commands.

20. The non-transitory computer readable medium of claim 15, wherein the processor is further caused to present the first report to a user equipment, the user equipment being configured to access the first service based at least in part upon the first plurality of network access commands in the first report.

* * * * *